(12) United States Patent
Iasello et al.

(10) Patent No.: US 7,890,343 B1
(45) Date of Patent: Feb. 15, 2011

(54) SYSTEM AND METHOD FOR GENERATING RISK MANAGEMENT CURVES

(75) Inventors: Anthony Iasello, Rockville Centre, NY (US); Philip H. Jung, East Brunswick, NJ (US); Samik Chandarana, London (GB); Kapil Bhatia, Jersey City, NJ (US); Robert P. Machado, Jr., Nutley, NJ (US); Doron Simon, New York, NY (US); Stephen Wayne Bennett, Pearland, TX (US); Chet Zhang, New York, NY (US); Gary Michelson, London (GB); Paul Coolen, London (GB); Mitchell Smith, London (GB)

(73) Assignee: JP Morgan Chase Bank, New York, NY (US)

( * ) Notice: Subject to any disclaimer, the term of this patent is extended or adjusted under 35 U.S.C. 154(b) by 972 days.

(21) Appl. No.: 11/033,081

(22) Filed: Jan. 11, 2005

(51) Int. Cl.
G06Q 10/00 (2006.01)
G06Q 40/00 (2006.01)
(52) U.S. Cl. .................. 705/2; 705/35; 705/38
(58) Field of Classification Search .................. 705/35, 705/36, 37, 38, 2–4
See application file for complete search history.

(56) References Cited

U.S. PATENT DOCUMENTS

| | | | |
|---|---|---|---|
| 3,634,669 A | 1/1972 | Soumas et al. | |
| 4,338,587 A | 7/1982 | Chiappetti | |
| 4,346,442 A | 8/1982 | Musmanno | |
| 4,355,372 A | 10/1982 | Goldberg et al. | |
| 4,376,978 A | 3/1983 | Musmanno | |
| 4,597,046 A | 6/1986 | Musmanno et al. | |
| 4,598,367 A | 7/1986 | DeFrancesco et al. | |
| 4,642,768 A | 2/1987 | Roberts | |
| 4,674,042 A | 6/1987 | Hernandez et al. | |
| 4,674,044 A | 6/1987 | Kalmus et al. | |
| 4,736,294 A | 4/1988 | Le Grand et al. | |

(Continued)

FOREIGN PATENT DOCUMENTS

EP 0597316 5/1994

(Continued)

OTHER PUBLICATIONS

Asch; How the RMA/Fair Isaac Credit-Scoring Model was Built, Journal of Commercial Lending, vol. 77, No. 10, Jun. 1995, pp. 10-16.

(Continued)

*Primary Examiner*—Gerald J. O'Connor
*Assistant Examiner*—Hiep V. Nguyen
(74) *Attorney, Agent, or Firm*—Lowenstein Sandler PC

(57) ABSTRACT

Accurate risk management curves are generated for companies that have limited market information available to generate a risk management curve purely from the market information by allowing a pre-existing risk management curve (referred to as a "leader curve") to be selected as a basis for generating a new risk management curve (referred to as a "target curve"). The leader curve may pertain to a company (referred to as the "leader company") that has similar characteristics to the company for which the target curve is being generated (referred to as the "target company"). Further, any known differences between the leader company and the target company may be reflected in the target curve by incorporating any number of offsets between the leader curve and the target curve.

18 Claims, 18 Drawing Sheets

U.S. PATENT DOCUMENTS

| | | | |
|---|---|---|---|
| 4,739,478 A | 4/1988 | Roberts et al. | |
| 4,760,604 A | 7/1988 | Cooper | |
| 4,774,663 A | 9/1988 | Musmanno et al. | |
| 4,831,526 A | 5/1989 | Luchs | |
| 4,859,187 A | 8/1989 | Peterson | |
| 4,859,837 A | 8/1989 | Halpern | |
| 4,866,634 A | 9/1989 | Reboh | |
| 4,897,811 A | 1/1990 | Scofield | |
| 4,903,201 A | 2/1990 | Wagner | |
| 4,972,504 A | 11/1990 | Daniel, Jr. | |
| 5,041,972 A | 8/1991 | Frost | |
| 5,093,907 A | 3/1992 | Hwong et al. | |
| 5,164,904 A | 11/1992 | Sumner | |
| 5,179,302 A | 1/1993 | Wagner | |
| 5,220,500 A | 6/1993 | Baird | |
| 5,227,874 A | 7/1993 | Von Kohorn | |
| 5,231,571 A | 7/1993 | D'Agostino | |
| 5,245,535 A | 9/1993 | Weiss et al. | |
| 5,267,314 A | 11/1993 | Stambler | |
| 5,278,751 A | 1/1994 | Adiano | |
| 5,297,032 A | 3/1994 | Trojan et al. | |
| 5,309,321 A * | 5/1994 | Olla et al. | 361/714 |
| 5,321,933 A | 6/1994 | Seifert et al. | |
| 5,351,187 A | 9/1994 | Hassett | |
| 5,381,470 A | 1/1995 | Cambray et al. | |
| 5,396,621 A | 3/1995 | MacGregor et al. | |
| 5,412,730 A | 5/1995 | Jones | |
| 5,444,844 A | 8/1995 | Inoue | |
| 5,481,647 A | 1/1996 | Brody | |
| 5,490,060 A | 2/1996 | Malec | |
| 5,502,805 A | 3/1996 | Anderson et al. | |
| 5,523,942 A | 6/1996 | Tyler et al. | |
| 5,524,073 A | 6/1996 | Stambler | |
| 5,550,734 A | 8/1996 | Tater | |
| 5,551,021 A | 8/1996 | Harada | |
| 5,583,778 A | 12/1996 | Wind | |
| 5,592,590 A | 1/1997 | Jolly | |
| 5,603,025 A | 2/1997 | Tabb | |
| 5,606,496 A | 2/1997 | D'Agostino | |
| 5,611,052 A | 3/1997 | Dykstra | |
| 5,615,109 A | 3/1997 | Eder | |
| 5,615,341 A | 3/1997 | Srikant et al. | |
| 5,623,591 A | 4/1997 | Cseri | |
| 5,644,727 A | 7/1997 | Atkins | |
| 5,649,116 A | 7/1997 | McCoy | |
| 5,655,085 A | 8/1997 | Ryan | |
| 5,657,388 A | 8/1997 | Weiss | |
| 5,657,437 A | 8/1997 | Bishop et al. | |
| 5,657,460 A | 8/1997 | Egan et al. | |
| 5,664,127 A | 9/1997 | Anderson et al. | |
| 5,671,363 A | 9/1997 | Cristofich et al. | |
| 5,675,746 A | 10/1997 | Marshall | |
| 5,689,650 A | 11/1997 | McClelland et al. | |
| 5,717,865 A | 2/1998 | Stratmann | |
| 5,721,847 A | 2/1998 | Johnson | |
| 5,727,161 A | 3/1998 | Purcell, Jr. | |
| 5,732,397 A | 3/1998 | DeTore | |
| 5,732,400 A * | 3/1998 | Mandler et al. | 705/26 |
| 5,752,236 A * | 5/1998 | Sexton et al. | 705/4 |
| 5,758,328 A | 5/1998 | Giovannoli | |
| 5,764,923 A | 6/1998 | Tallman et al. | |
| 5,765,144 A | 6/1998 | Larche | |
| 5,768,158 A | 6/1998 | Adler et al. | |
| 5,774,878 A | 6/1998 | Marshall | |
| 5,774,883 A | 6/1998 | Andersen et al. | |
| 5,793,302 A | 8/1998 | Stambler | |
| 5,799,286 A | 8/1998 | Morgan et al. | |
| 5,802,502 A | 9/1998 | Gell | |
| 5,812,968 A | 9/1998 | Hassan | |
| 5,819,237 A | 10/1998 | Garman | |
| 5,842,178 A | 11/1998 | Giovannoli | |
| 5,848,400 A | 12/1998 | Chang | |
| 5,852,811 A | 12/1998 | Atkins | |
| 5,870,721 A | 2/1999 | Norris | |
| 5,873,096 A | 2/1999 | Lim | |
| 5,875,437 A | 2/1999 | Atkins | |
| 5,878,258 A | 3/1999 | Pizi | |
| 5,878,403 A | 3/1999 | Agrawal et al. | |
| 5,893,079 A | 4/1999 | Cwenar | |
| 5,913,202 A | 6/1999 | Motoyama | |
| 5,918,217 A | 6/1999 | Maggioncalda | |
| 5,920,848 A | 7/1999 | Schutzer | |
| 5,924,094 A | 7/1999 | Sutter | |
| 5,930,775 A | 7/1999 | McCauley | |
| 5,940,811 A | 8/1999 | Norris | |
| 5,940,812 A | 8/1999 | Tengel et al. | |
| 5,950,175 A | 9/1999 | Austin | |
| 5,963,953 A | 10/1999 | Cram et al. | |
| 5,970,467 A | 10/1999 | Alavi | |
| 5,974,148 A | 10/1999 | Stambler | |
| 5,974,396 A | 10/1999 | Anderson | |
| 5,978,779 A | 11/1999 | Stein et al. | |
| 5,983,206 A | 11/1999 | Oppenheimer | |
| 5,987,434 A | 11/1999 | Libman | |
| 5,991,741 A | 11/1999 | Speakman et al. | |
| 5,995,942 A | 11/1999 | Smith et al. | |
| 5,999,907 A | 12/1999 | Donner | |
| 6,008,817 A | 12/1999 | Gilmore, Jr. | |
| 6,009,415 A | 12/1999 | Shurling et al. | |
| 6,018,722 A | 1/2000 | Ray et al. | |
| 6,021,397 A | 2/2000 | Jones et al. | |
| 6,026,370 A | 2/2000 | Jermyn | |
| 6,029,139 A | 2/2000 | Cunningham et al. | |
| 6,029,195 A | 2/2000 | Herz | |
| 6,032,125 A | 2/2000 | Ando | |
| 6,044,371 A | 3/2000 | Person et al. | |
| 6,055,510 A | 4/2000 | Henrick | |
| 6,055,517 A | 4/2000 | Friend et al. | |
| 6,064,985 A | 5/2000 | Anderson | |
| 6,070,147 A | 5/2000 | Harms et al. | |
| 6,073,115 A | 6/2000 | Marshall | |
| 6,076,072 A | 6/2000 | Libman | |
| 6,078,892 A | 6/2000 | Anderson et al. | |
| 6,078,901 A | 6/2000 | Ching | |
| 6,088,686 A | 7/2000 | Walker et al. | |
| 6,089,284 A | 7/2000 | Kaehler et al. | |
| 6,092,050 A | 7/2000 | Lungren et al. | |
| 6,097,391 A | 8/2000 | Wilcox | |
| 6,108,641 A | 8/2000 | Kenna et al. | |
| 6,115,697 A | 9/2000 | Gottstein | |
| 6,122,623 A | 9/2000 | Garman | |
| 6,154,731 A | 11/2000 | Monks et al. | |
| 6,161,098 A | 12/2000 | Wallman | |
| 6,167,378 A * | 12/2000 | Webber, Jr. | 705/8 |
| 6,173,270 B1 | 1/2001 | Cristofich et al. | |
| 6,185,582 B1 | 2/2001 | Zellweger et al. | |
| 6,188,403 B1 | 2/2001 | Sacerdoti et al. | |
| 6,188,405 B1 | 2/2001 | Czerwinski et al. | |
| 6,188,993 B1 | 2/2001 | Eng et al. | |
| 6,195,092 B1 | 2/2001 | Dhond et al. | |
| 6,199,077 B1 | 3/2001 | Inala et al. | |
| 6,202,052 B1 | 3/2001 | Miller | |
| 6,202,053 B1 | 3/2001 | Christiansen et al. | |
| 6,202,054 B1 | 3/2001 | Lawlor et al. | |
| 6,205,453 B1 | 3/2001 | Tucker et al. | |
| 6,212,494 B1 | 4/2001 | Boguraev | |
| 6,222,557 B1 | 4/2001 | Pulley, IV et al. | |
| 6,236,978 B1 | 5/2001 | Tuzhilin | |
| 6,243,093 B1 | 6/2001 | Czerwinski et al. | |
| 6,249,775 B1 | 6/2001 | Freeman et al. | |
| 6,256,649 B1 | 7/2001 | Mackinlay et al. | |
| 6,263,320 B1 | 7/2001 | Danilunas et al. | |
| 6,263,321 B1 * | 7/2001 | Daughtery, III | 705/36 R |
| 6,269,346 B1 | 7/2001 | Cristofich et al. | |

| | | |
|---|---|---|
| 6,271,863 B1 | 8/2001 | Bose et al. |
| 6,278,981 B1 | 8/2001 | Dembo et al. |
| 6,282,551 B1 | 8/2001 | Anderson et al. |
| 6,304,858 B1* | 10/2001 | Mosler et al. ............... 705/37 |
| 6,311,144 B1 | 10/2001 | Abu El Ata |
| 6,317,726 B1 | 11/2001 | O'Shaughnessy |
| 6,317,750 B1 | 11/2001 | Tortolani et al. |
| 6,321,212 B1 | 11/2001 | Lange |
| 6,330,551 B1 | 12/2001 | Burchetta et al. |
| 6,332,135 B1* | 12/2001 | Conklin et al. ............... 705/80 |
| 6,336,105 B1* | 1/2002 | Conklin et al. ............... 705/80 |
| 6,338,050 B1* | 1/2002 | Conklin et al. ............... 705/80 |
| 6,349,290 B1 | 2/2002 | Horowitz et al. |
| 6,349,291 B1 | 2/2002 | Varma |
| 6,360,188 B1 | 3/2002 | Freidman et al. |
| 6,360,210 B1* | 3/2002 | Wallman ............... 705/36 R |
| 6,363,393 B1 | 3/2002 | Ribitzky |
| 6,405,204 B1 | 6/2002 | Baker et al. |
| 6,440,933 B1* | 8/2002 | Bodor et al. ............... 514/11 |
| 6,452,613 B1 | 9/2002 | Lefebvre et al. |
| 6,490,569 B1 | 12/2002 | Grune et al. |
| 6,496,832 B2 | 12/2002 | Chi et al. |
| 6,502,080 B1 | 12/2002 | Eichorst et al. |
| 6,513,018 B1 | 1/2003 | Culhane |
| 6,564,214 B1 | 5/2003 | Bhide |
| 6,597,379 B1 | 7/2003 | Morris et al. |
| 6,601,044 B1 | 7/2003 | Wallman |
| 6,624,752 B2 | 9/2003 | Klitsgaard et al. |
| 6,725,257 B1 | 4/2004 | Cansler et al. |
| 6,738,933 B2 | 5/2004 | Fraenkel et al. |
| 6,741,975 B1 | 5/2004 | Nakisa et al. |
| 6,757,710 B2 | 6/2004 | Reed |
| 6,785,661 B1 | 8/2004 | Mandler et al. |
| 6,850,923 B1 | 2/2005 | Nakisa et al. |
| 6,892,052 B2 | 5/2005 | Kotola et al. |
| 6,985,880 B1 | 1/2006 | Hodgdon et al. |
| 7,058,817 B1 | 6/2006 | Ellmore |
| 7,089,207 B1* | 8/2006 | Lardy et al. ............... 705/38 |
| 7,155,614 B2 | 12/2006 | Ellmore |
| 7,171,385 B1 | 1/2007 | Dembo et al. |
| 7,181,427 B1 | 2/2007 | Defrancesco et al. |
| 7,225,153 B2 | 5/2007 | Lange |
| 7,236,951 B2* | 6/2007 | Lipton et al. ............... 705/35 |
| 7,340,431 B1 | 3/2008 | McManus et al. |
| 7,353,383 B2 | 4/2008 | Skingle |
| 7,409,364 B1 | 8/2008 | Barton et al. |
| 7,444,672 B2 | 10/2008 | Ellmore |
| 7,461,265 B2 | 12/2008 | Ellmore |
| 2001/0011243 A1 | 8/2001 | Dembo et al. |
| 2001/0025264 A1 | 9/2001 | Deaddio et al. |
| 2001/0027437 A1 | 10/2001 | Turbeville et al. |
| 2001/0056398 A1 | 12/2001 | Scheirer |
| 2002/0007330 A1 | 1/2002 | Kumar et al. |
| 2002/0019791 A1 | 2/2002 | Goss et al. |
| 2002/0019802 A1 | 2/2002 | Malme et al. |
| 2002/0019803 A1 | 2/2002 | Muller |
| 2002/0059093 A1 | 5/2002 | Barton et al. |
| 2002/0059139 A1 | 5/2002 | Evans |
| 2002/0067373 A1 | 6/2002 | Roe et al. |
| 2002/0073005 A1 | 6/2002 | Welnicki et al. |
| 2002/0078086 A1 | 6/2002 | Alden et al. |
| 2002/0091621 A1 | 7/2002 | Conklin et al. |
| 2002/0111850 A1 | 8/2002 | Smrckas et al. |
| 2002/0111890 A1 | 8/2002 | Sloan et al. |
| 2002/0133383 A1 | 9/2002 | Chao et al. |
| 2002/0147668 A1 | 10/2002 | Smith et al. |
| 2002/0152157 A1 | 10/2002 | Stoyanov et al. |
| 2002/0198797 A1 | 12/2002 | Cooper et al. |
| 2003/0018492 A1 | 1/2003 | Carlson |
| 2003/0018558 A1 | 1/2003 | Heffner et al. |
| 2003/0028466 A1 | 2/2003 | Jenson et al. |
| 2003/0061132 A1 | 3/2003 | Yu, Sr. et al. |
| 2003/0061137 A1 | 3/2003 | Leung et al. |
| 2003/0074167 A1 | 4/2003 | Browne et al. |
| 2003/0093351 A1 | 5/2003 | Sarabanchong |
| 2003/0093408 A1 | 5/2003 | Brown et al. |
| 2003/0149659 A1 | 8/2003 | Danaher et al. |
| 2003/0208429 A1 | 11/2003 | Bennett |
| 2003/0212628 A1 | 11/2003 | Kuttan et al. |
| 2003/0216965 A1 | 11/2003 | Libman |
| 2003/0229582 A1 | 12/2003 | Sherman et al. |
| 2004/0019541 A1 | 1/2004 | William et al. |
| 2004/0030626 A1 | 2/2004 | Libman |
| 2004/0039588 A1 | 2/2004 | Libman |
| 2004/0054610 A1 | 3/2004 | Amstutz et al. |
| 2004/0054622 A1 | 3/2004 | Strayer et al. |
| 2004/0117300 A1 | 6/2004 | Jones et al. |
| 2004/0186773 A1 | 9/2004 | George et al. |
| 2004/0215545 A1* | 10/2004 | Murakami et al. ............... 705/36 |
| 2004/0236641 A1 | 11/2004 | Abbott et al. |
| 2004/0267651 A1 | 12/2004 | Jenson et al. |
| 2005/0004855 A1 | 1/2005 | Jenson et al. |
| 2005/0004856 A1 | 1/2005 | Brose et al. |
| 2005/0010510 A1 | 1/2005 | Brose et al. |
| 2005/0027632 A1 | 2/2005 | Zeitoun et al. |
| 2005/0060252 A1 | 3/2005 | Doddington |
| 2005/0108150 A1* | 5/2005 | Pethick et al. ............... 705/38 |
| 2005/0144108 A1 | 6/2005 | Loeper |
| 2005/0209939 A1 | 9/2005 | Joseph et al. |
| 2005/0234807 A1 | 10/2005 | Toffey |
| 2007/0011176 A1 | 1/2007 | Vishnubhotla |
| 2007/0124227 A1 | 5/2007 | Dembo et al. |
| 2007/0192618 A1 | 8/2007 | Ellmore |

FOREIGN PATENT DOCUMENTS

| | | |
|---|---|---|
| JP | 2002-163589 | 6/2002 |
| WO | 99/27479 | 6/1999 |
| WO | 00/02256 | 1/2000 |
| WO | 02/069212 | 9/2002 |

OTHER PUBLICATIONS

Taylor et al.; Card Issuers Turn to Scoring As They Face Increasing Risk, Financial Services Report, vol. 8, No. 15, Jul. 24, 1991, p. 1.

Roger et al.; A Credit Scoring Model to Evaluate the Credit Worthiness of Credit Card Applicants, Developments in Marketing Science, vol. 5, 1982.

Hickman; Using Software to Soften Big-Time Competition, Bank Systems and Technology, vol. 31, No. 8, Jun. 1994, pp. 38-40.

Sullivan; Scoring Borrower Risk, Mortage Banking, vol. 55, No. 2, Nov. 1994, pp. 94-98.

Jameson; Expanding Risk Management Strategies: Key to Future Survival, Credit World, vol. 84, No. 5, May 1996, pp. 16-18.

Friedland; Credit Scoring Digs Deeper Into Data, Credit World, vol. 84, No. 5, May 1996, pp. 19-23.

Credit Scoring New Markets, Bank Technology News, vol. 9, No. 7, Jul. 1996, p. 1.

Carey; The Sub-Prime Credit Market: Identifying Good Risks for Unsecured Cards, Credit World, vol. 85, No. 1, Sep. 1996, pp. 13-15.

Opportunity Knocks at Scoring's Door, Collection and Credit Risk, vol. 2, No. 4, Apr. 1997, p. 53.

Makuch; Managing Consumer Credit Delinquency in the US Economy: A Multi-Billion Dollar Management Science Application, Interfaces, Feb. 1992, pp. 90-109.

Portner; There Must Be A Better Way, Mortgage Banking, vol. 53, No. 2, Nov. 1, 1992, pp. 12-22.

Product Data Integration Technologies, Inc., Step Integratin Authors, Printed on Apr. 26, 1999.

Freemarkets, Printed on Apr. 26, 1999.

At Your Request, www.wingspanbank.com, Sep. 28, 1999.

Meredith; Internet Bank Moves Closer to Virtual Reality, USA Today, May 5, 1995.

CSU/DSU (Channel Service Unit/Data Service Unit), CTI (Computer-Telephony Integration), pp. 208-210.

Kneis; Hedge Fund Strategies: A Primer, Canadianhedgewatch, p. 3.

Derivatives Primer, CEIBA, Association for Financial Professionals, Committee on Investment of Employee Benefit Assets, Dec. 2001.

Hedge Fund Primer—The Basics, KSP Capital Management LLC, information@kspcapital.com, Printed Jul. 24, 2002, 18 Pages.

Armstrong; Fund of Funds: Perfect Solution or Dangerous Shortcut?, Investor Solutions, Inc., www.investorsolutions.com, Printed Jul. 24, 2002.

Hedge Fund Primer About Fund of Funds, Links Securities LLC, www.hedgefund.net/prime_fof.php3, 2002, 2 Pages.

Why a Fund of Funds?, Altegris Investments, www.managedinvestments.com/hedge_fund_of_funds, Printed Jul. 24, 2002.

Trading and Capital-Markets Activities Manual, Instrument Profiles: Structured Notes, Federal Reserve System, The Turin Group, www.toerien.com/books/manual/4040.htm, Printed Jul. 24, 2002, 14 Pages.

Primer: Derivatives Instruments, Derivatives Study Center, www.econstrat.org/dscinstruments.htm, Printed Jul. 24, 2002, 8 Pages.

Pourmokhtar; A Hedge Fund Primer Version 0.1, www.emf.net/?farzin/hedgefund.html, Printed Jul. 24, 2002, 5 Pages.

Huddling With William Bernstein: Small Town Doctor, Investing Pro.

Bogle; Mutual Funds At the Millennium: Fund Directors and Fund Myths, The Vanguard Group to the '40 ACT Institute of PLI (Practicing Law Institute), New York, NY, May 15, 2000, 15 Pages.

Quinn; Credit Card Issuers Keeping a Closer Watch on How You Pay Bills, Washington Post, Staying Ahead, Business Section P6, Apr. 25, 1988, 1 Page.

Spirer; When Bad Credit Behavior Becomes the Norm, Credit World, vol. 85, Iss. 6, Jul./Aug. 1997, p. 18.

Markese; Can You Trust Mutual Fund Rankings?, Consumers' Research Magazine, vol. 76, No. 10, Research Library, Oct. 1993, p. 20.

McLaughlin; Tapping Web to Search for Right Fund—Fundprofiler Speeds Search, Boston Herald, Boston, MA, Dec. 16, 1999, p. 70.

Cumby et al.; Evaluating the Performance of International Mutual Funds, The Journal of Finance, vol. 45, No. 2, Jun. 1990, pp. 497-521.

Gottfried et al.; Graphical Definitions: Making Spreadsheets Visual Through Direct Manipulation and Gestures, Visual Languages, 1997, Proceedings, 1997 IEEE Symposium on, Sep. 23-26, 1997, pp. 246-253, Abstract.

GS-CALC 6.0.1.1.; JPS Development; http://download.com, Printed Sep. 3, 2003.

Buchner et al.; HOTDOC: A Flexible Framework for Spatial Composition, Visual Languages, 1997, Proceedings, 1997 IEEE Symposium, Abstract, Sep. 23-26, 1997, pp. 92-99.

Snyder et al.; Identifying Design Requirements Using Analysis Structures, Aerospace and Electronics Conference, 1991, NAECON, 1991, vol. 2, Abstract, May 20-24, 1991, pp. 786-792.

Davenport et al.; Numbers—A Medium That Counts [Spreadsheet Software]; Computer Graphics and Applications; IEEE; vol. 11; Issue 4; Abstract, Jul. 1991, pp. 39-44.

Stolte et al.; Polaris: A System for Query, Analysis, and Visualization of Multidimensional Relational Databases; Visualization and Computer Graphics; IEEE Transactions on; vol. 8; Issue 1; Abstract, Jan./Mar. 2002, pp. 52-65.

Chi et al.; Principles for Information Visualization Spreadsheets; Computer Graphics and Applications; IEEE; vol. 18; Issue 4; Abstract, Jul./Aug. 1998, pp. 92-99.

Spreadsheet Mapper; www.panopticon.com, Printed Oct. 1, 2003.

TCS 4.20; Telsys SAS; http://download.com, Printed Sep. 30, 2003.

Spoerri; Visual Tools for Information Retrieval; Visual Languages; 1993; Proceedings; 1993 IEEE Symposium on; pp. 160-168; Abstract.

Internet; Lending Tree, Mortgage Apply Online in Minutes, www.lendingtree.com, 7 Pages, Printed Feb. 1, 1999.

Storms, Phillip; Using Mortgage Credit to Achieve Client Objectives, Journal of Financial Planning, ISSN/ISBN: 10403981, Proquest Document ID: 10403981, vol. 9, Issue 5, 9 Pages, Oct. 1996.

Storms, Phillip; Using Mortgage Credit to Achieve Client Objectives, Journal of Financial Planning, ISSN/ISBN: 10403981; Proquest Document ID:10403981; Denver: vol. 9; Issue 5; 9 Pages, Oct. 1996.

Anonymous, "Kmart MasterCard", CardWeb.com, Sep. 26, 2000, Web, Jan. 2, 2008.

Anonymous, "Two Chips Can Be Better Than One", ProQuest, May 2001, Web, Dec. 17, 2007.

"Posted Commentaries: Kmart MasterCard", CardOffers.com, Web, Jan. 2, 2008.

Hinds, Michael deCourcy, "Making the Most of Fast-Falling Mortgage Rates", New York Times, Late City Final Edition ED, Jun. 30, 1985, Col. 2, p. 1.

Xiaoyan Li, "Time-Based Language Models," CIKMO 2003, Nov. 3-8, 2003, New Orleans, LA, USA, Copyright 2003 ACM.

Open Financial Exchage (OFX) Specification 2.0 Tax Extensions Version 1.0, Jun. 30, 2000.

TEI Wisconsin Chapter-Wisconsin Department of Revenue Liaison Meeting, Tax Executives Institute, The Tax Executive, Mar.-Apr. 1995.

* cited by examiner

SYSTEM AND METHOD FOR GENERATING RISK MANAGEMENT CURVES

FIELD OF THE INVENTION

This invention relates to a system and a method for generating curves used by organizations to evaluate their risk positions. In particular, the present invention pertains to a system and a method for deriving a target curve from a pre-existing leader curve deemed to have characteristics related to the target curve.

BACKGROUND OF THE INVENTION

FIG. 1 illustrates a Credit Default Swap, or "CDS," which is a type of contract that is often used to hedge against the risk that a company 103 will default on a loan or some other financial obligation. A CDS involves a protection buyer 101 and a protection seller 102. Most commonly, the protection buyer 101 pays the protection seller 102 one or more fees, and the protection seller 102 pays the protection buyer 101 a notional amount if and only if a predefined credit event occurs. For example, assume protection buyer 101 makes a loan to company 103. If the protection buyer 101 desires to hedge against the risk that the company 103 will default on the loan, the protection buyer 101 may enter into a CDS with the protection seller 102. In this example, the CDS may be structured so that the protection buyer 101 agrees to pay the protection seller 102 one or more fees, and, in return, the protection seller 102 agrees to pay the protection buyer 101 a notional amount in the event that the company 103 defaults on the loan.

The protection buyer 101 and the protection seller 102 may assign their benefits and obligations under the CDS to another party. For example, the protection buyer 101 may assign to an assignee 104, for example, its obligation to pay the protection seller 102 the one or more fees and its benefit to receive the notional amount from the protection seller 102 in the event that the company 103 defaults. In this situation, the assignee 104 is obligated to pay the protection seller 102 the one or more fees, but would receive the notional amount from the protection seller 102 if the company 103 defaults. On the other hand, the protection seller 102 may assign to an assignee 105 its obligation to pay the notional amount and its benefit of receiving the one or more fees. If protection buyer 101 assigns to the assignee 104, and the protection seller 102 assigns to the assignee 105, the assignee 104 pays the one or more fees to the assignee 105, and the assignee 105 pays the assignee 104 the notional amount if the company 103 defaults.

Depending upon the perceived credit strength of the company 103, the assignee 104 will pay more or less money to the protection buyer 101 in order to step into the position of the protection buyer 101 in the CDS. Similarly, depending upon the perceived credit strength of the company 103, the assignee 105 will pay more or less money to the protection seller 102 in order to step into the position of the protection seller 102 in the CDS. Accordingly, the price at which other parties are willing to pay to enter into a CDS via assignment is an indicator of the perceived credit strength of the company 103.

The price that the assignee 104 is willing to pay to step into the position of the protection buyer 101 is referred to herein as a market value of the CDS. The market value of the CDS not only depends upon the perceived credit strength of the company 103, but also the duration of the CDS, referred to herein as the "tenor." The tenor of the CDS is the amount of time that the protection seller 102 is obligated to pay the notional amount to the protection buyer 101 if the company 103 defaults. For example, if the CDS has a tenor of 3 years, the protection seller 102 is obligated to pay the amount to the protection buyer 101 if the company 103 defaults at any time within those three years. Accordingly, a longer tenor typically commands a higher market value, because a longer tenor provides a longer duration of protection against default for the protection buyer 101.

An illustration of the market value of a CDS versus time for the company 103 is shown, for example, at FIG. 2. A curve, such as the one in FIG. 2, which shows market value versus time of a CDS, is referred to herein as a "CDS curve." As can be seen in FIG. 2, the market value of a CDS for the company 103 increases as the tenor increases.

Conventionally, CDS curves have been manually generated by traders involved in trading CDSs between parties, such as trading a CDS between the protection buyer 101 and the assignee 104. To continue with the example of FIG. 1, a trader who is actively involved in trading CDSs based upon the credit of the company 103 is aware of current market values of such CDSs. Assume that a trader just sold a CDS based upon the credit of the company 103 from the protection buyer 101 to the assignee 104 with a tenor of 1 year for $10. In this case, the trader would record the 1 year CDS price for the company 103 as $10, as shown, for example in FIG. 2. If the trader traded a 5-year CDS for $60, but not a 3-year, the trader may estimate the cost of the 3-year as being between $10 and $60. Accordingly, traders use their knowledge of the marketplace to create CDS curves, such as that shown in FIG. 2. Therefore, the accuracy of the CDS curve is dependent upon such knowledge. If a company has not had many CDSs traded for it, little or no market information exists from which to generate a CDS curve.

Accurate CDS curves are important for protection sellers because they are used by protection sellers to determine their overall risk position. In other words, CDS curves assist protection sellers in evaluating how much risk they are exposed to at any given time. If a protection seller is involved in many high risk CDSs, i.e., ones where the protection seller is likely to make a payout, the protection seller may decide that it should only enter into low risk CDSs for the time being or take other actions to hedge the increased risk.

Therefore, a need exists in the art for improved methods for generating accurate CDS curves.

SUMMARY OF THE INVENTION

These problems are addressed and a technical solution achieved in the art by a system and a method for generating risk management curves. According to the present invention, when a new risk management curve is needed for a particular entity, a pre-existing risk management curve (referred to herein as a "leader curve") is selected, and the new risk management curve (referred to herein as a "follower curve" or a "target curve") is derived from the leader curve. The leader curve may be chosen because it pertains to a company that has characteristics similar to the company for which the target curve is to be derived. On the other hand, the leader curve may pertain to the same entity for which the target curve is generated, but may be for a different instrument.

According to one embodiment of the present invention, the target curve is derived by determining an offset from one or more points in the leader curve. According to another embodiment of the invention, the target curve is determined by adding to or subtracting from the leader curve a second risk management curve (referred to herein as an "offsetting curve"). The offsetting curve may be a pre-existing curve, such as the U.S. Government curve, known in the art. Offsets from the leader curve may reflect known differences between the company to which the leader curve pertains and the company to which the target curve pertains.

According to a further embodiment of the present invention, the risk management curves are CDS curves. However, the risk management curves may relate to any of, without limitation, curves pertaining to portfolio credit derivatives, collateralized asset swaps, credit swap options, credit default swaps, credit downgrades, credit linked notes, asset backed securities, wrapped asset backed securities, collateralized notes, collateralized loans, super seniors, equity default swaps, equity stability swaps, equity bill swaps, and bonds. According to yet another embodiment of the invention, the target curve is updated over time to reflect changes in its associated leader curve and, if applicable, its associated offsetting curve.

BRIEF DESCRIPTION OF THE DRAWINGS

The present invention will be more readily understood from the detailed description of preferred embodiments presented below considered in conjunction with the attached drawings, of which.

It is to be understood that these drawings are for purposes of illustrating the concepts of the invention and are not to scale.

DETAILED DESCRIPTION OF THE INVENTION

The present invention allows accurate risk management curves to be generated for companies for which limited market information is available to generate a reasonably accurate risk management curve purely on the market information. The present invention achieves this result by allowing a pre-existing risk management curve (referred to herein as a "leader curve") to be selected as a basis for generating a new risk management curve (referred to herein as a "target curve"). The leader curve may be a credit risk curve and advantageously pertains to a company (referred to herein as the "leader company") that has similar characteristics to the company for which the target curve is being generated (referred to herein as the "target company"). Further, any known differences between the leader company and the target company may be reflected in the target curve by incorporating any number of offsets between the leader curve and the target curve. Optionally, the leader company and the target company may be the same company. In this case, the leader curve may be a more liquid curve for the company than the target curve. Further, the leader curve and the target curve may be for different instruments associated with the same company.

Figure 1:
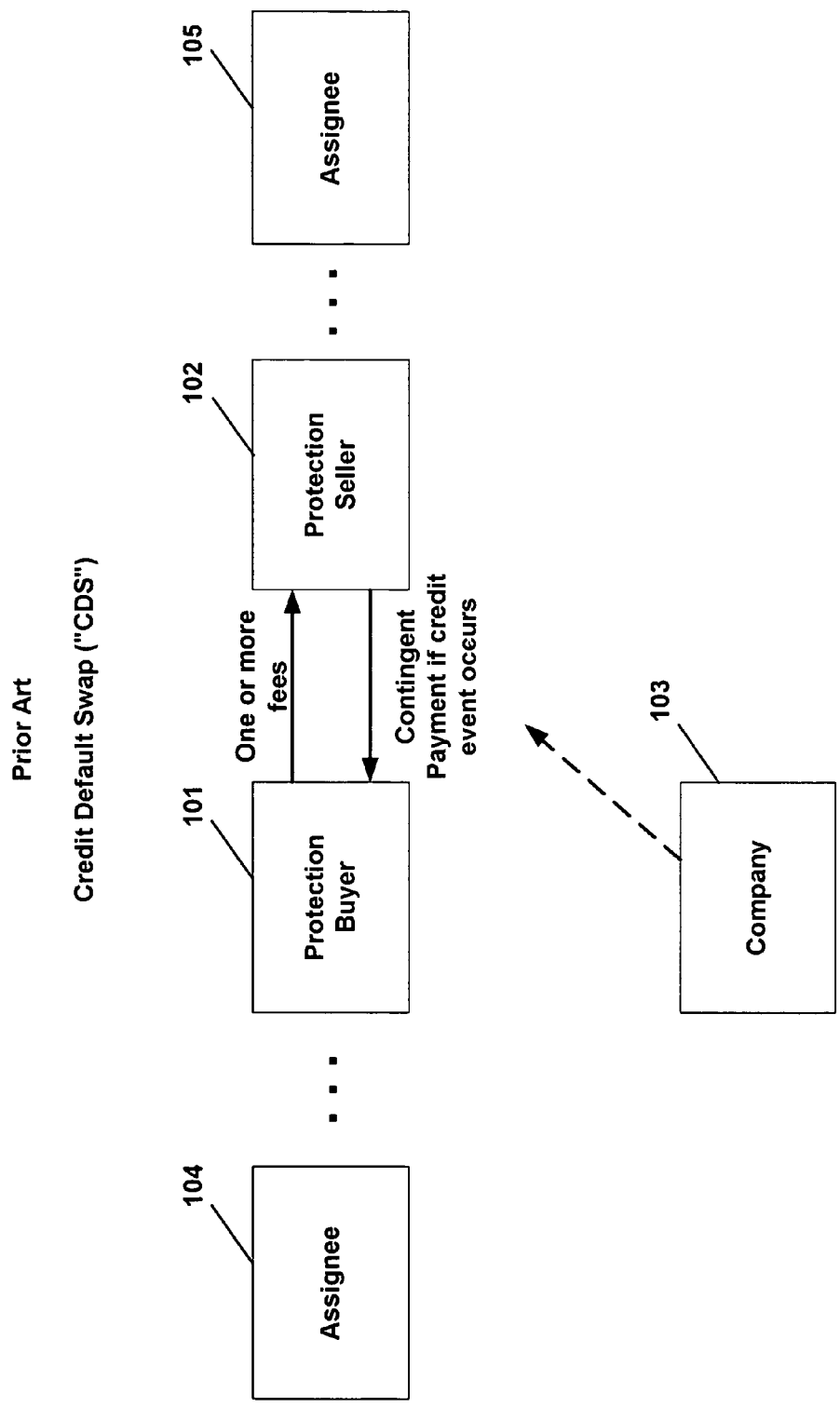
FIG. 1 illustrates a Credit Default Swap ("CDS")
Figure 2:
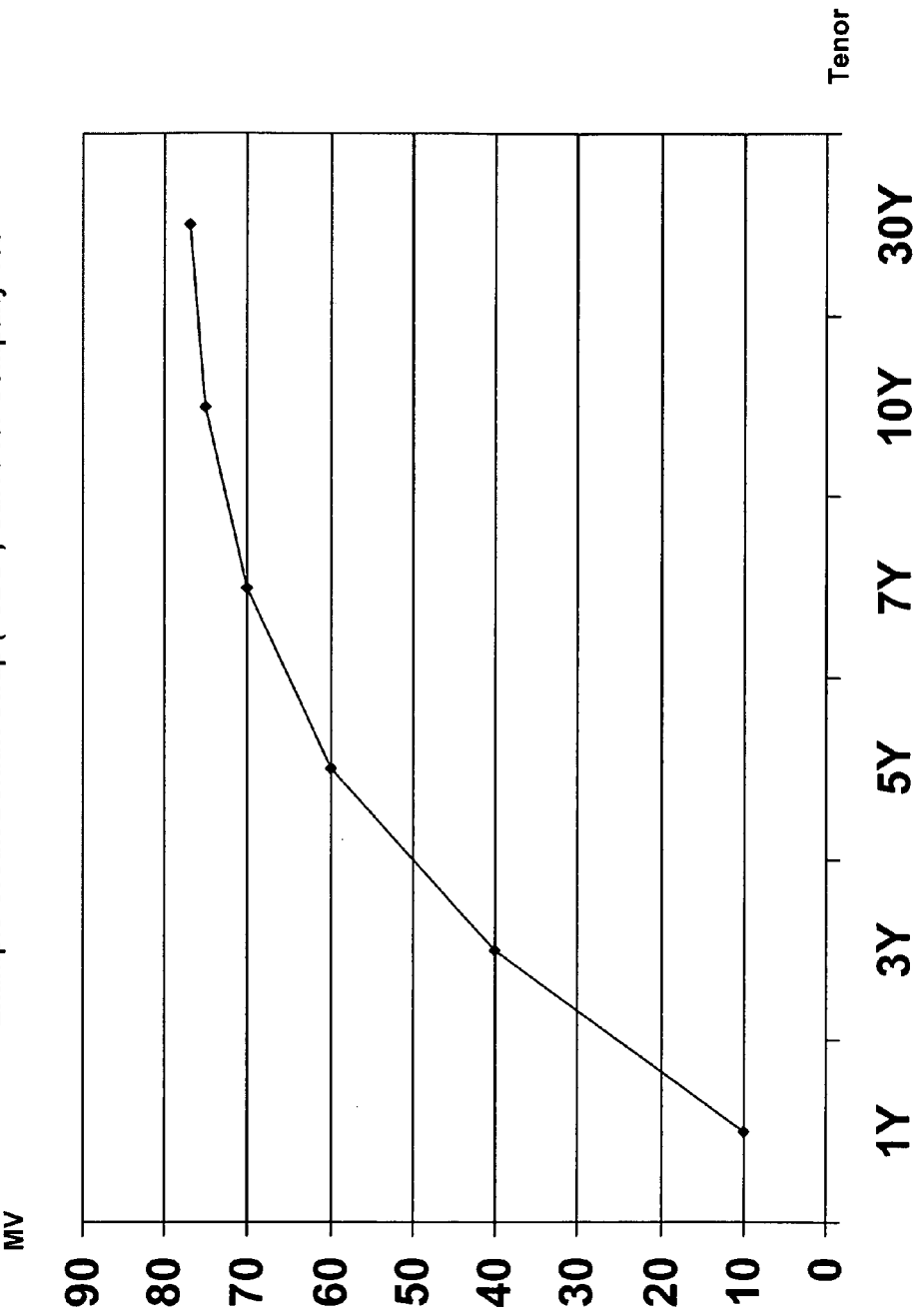
FIG. 2 illustrates an example of a CDS curve.
Figure 3:
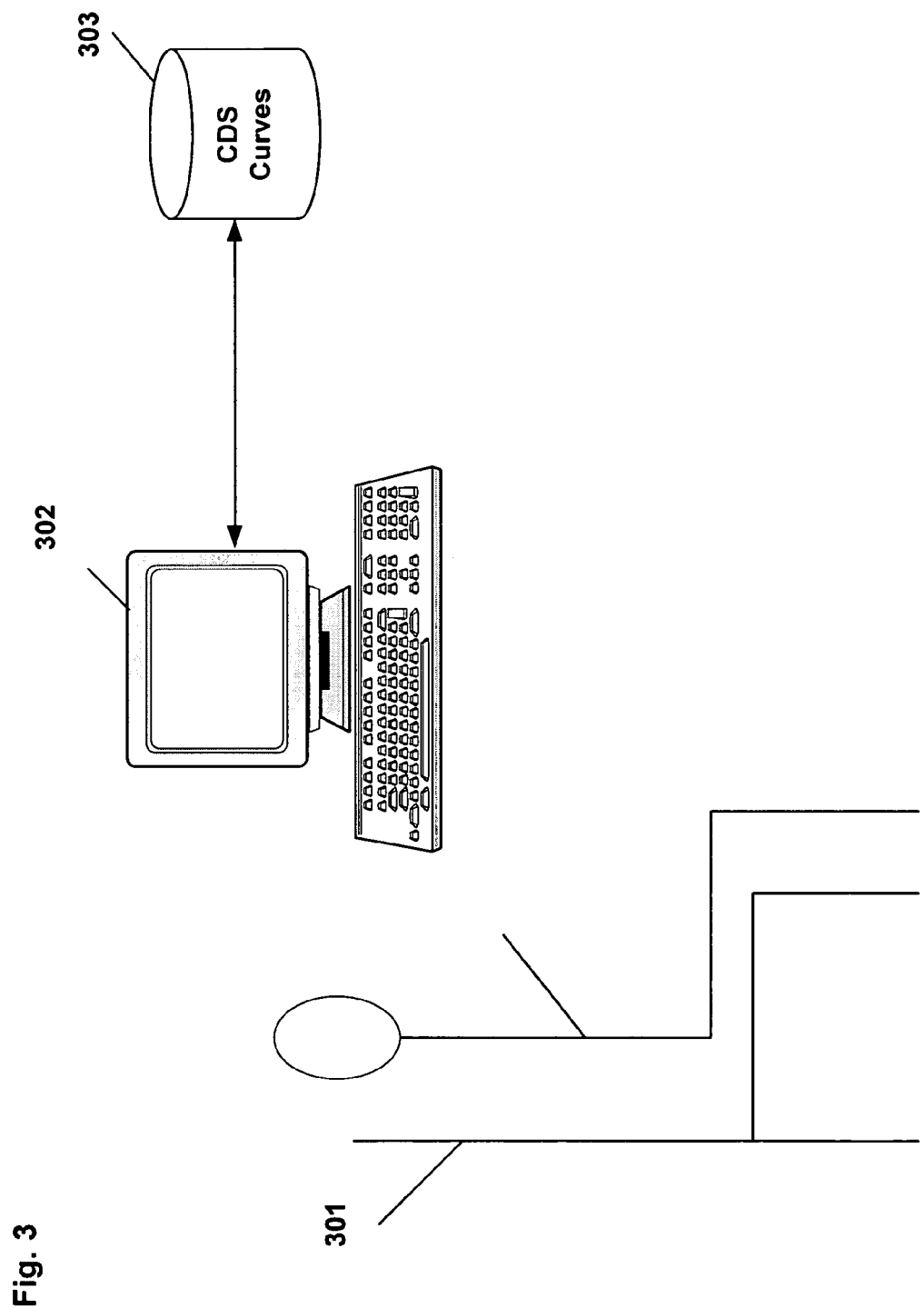
FIG. 3 illustrates a computer hardware arrangement, according to an embodiment of the present invention.

Turning now to FIG. 3, a computer system that may be used to execute processes according to an embodiment of the invention is illustrated. A user 301, who may be a Credit Default Swap ("CDS") trader, uses computer 302 to retrieve an existing CDS curve from a data storage system 303 and/or generate a new CDS curve that may be subsequently stored in the data storage system 303. For example, a trader may be interested in determining the market value for a CDS pertaining to a particular company, "Company X". The trader, in this example, user 301, may attempt to retrieve an existing CDS curve for Company X. However, if no such curve exists, the user 301 may instruct the computer 302 to generate a CDS curve for Company X according to the processes disclosed herein. The retrieved or generated CDS curves is then used by the user 301 to evaluate whether or not to make a trade and/or may be used by an organization to determine an overall risk position of the organization.

The term "computer" is intended to refer to a desktop computer, a laptop computer, a hand-held computer, a personal digital assistant ("PDA"), or any data processing device, whether implemented with electronics, optics, both, or otherwise. Although FIG. 3 shows a single computer, one skilled in the art will appreciate that multiple computers communicatively connected may be used. The term "communicatively connected" is intended to refer to any connection between devices through which data may be communicated, whether wired, wireless, or both. The term communicatively connected is also intended to refer to communication within a single device or computer and communication between devices and/or computers.

The term "data storage system" is intended to refer to any computer-accessible data storage device or devices, whether volatile or nonvolatile. Although only one object is shown for data storage system 303 in FIG. 3, one skilled in the art will appreciate that the data storage system 303 may include a plurality of devices communicatively connected to the computer 302. Further, although shown separate from the computer 302, the data storage system 303 may be partially or completely located within the computer 302.

Figure 4:
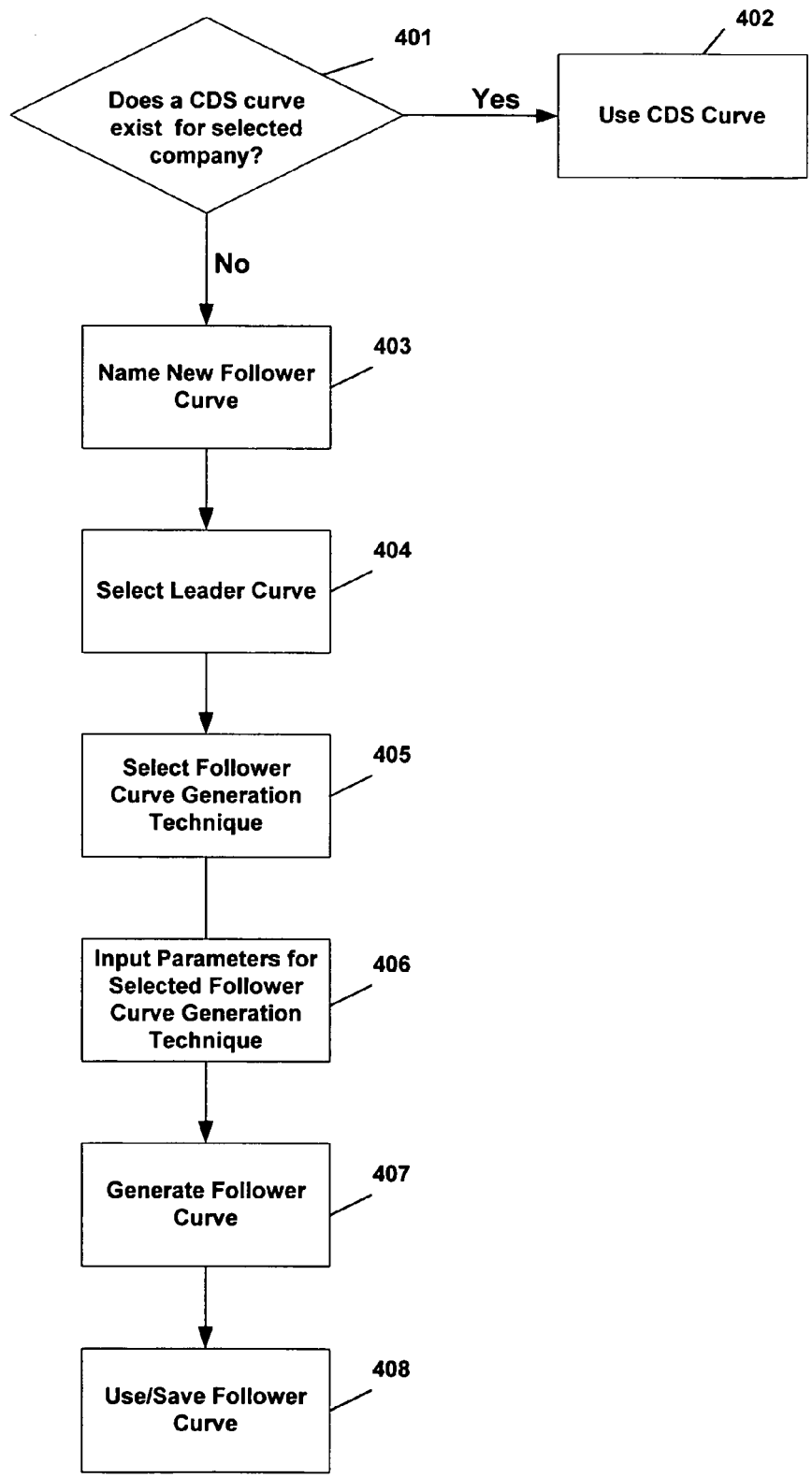
FIG. 4 illustrates a process flow, according to an embodiment of the present invention.

A process flow according to an embodiment of the present invention will now be described with reference to FIG. 4. One skilled in the art will appreciate that the invention is not limited to the particular ordering of steps shown in FIG. 4. At step 401, it is determined whether a CDS curve exists for the company requested by user 301, which may be, for example, Company X. If a CDS curve does exist for Company X, then it is presented to the user 301 at step 402. If a CDS curve does not exist for Company X, a new CDS curve ("target curve") may be generated for Company X. The process of generating a new CDS curve begins at step 403, where the user 301 may input a name for the target curve. Alternatively, a name may be generated by the computer 302, which may then be modified by the user 301. At step 404, the user 301 may select a pre-existing CDS curve ("leader curve") from the data storage system 303 from which the target curve is to be derived.

Optionally, the leader curve is a CDS curve for a company having similar characteristics as the company for which the target curve is to be generated, in this example, Company X. For instance, if the user 301 is attempting to determine the market value for CDSs based upon the credit strength of Company X, but little market data exists, the user 301 may select a pre-existing CDS curve for a parent company of Company X, or a company in the same industry as Company X having a similar financial status. However, the user 301 may be aware of circumstances that distinguish Company X from the leader company. For instance, although Company X and the leader company have similar credit characteristics, the user 301 may know that Company X has more short term risk of default than the leader company and, consequently, will want to adjust the target curve to reflect the higher short term risk.

Depending upon how the user 301 wants to adjust the leader curve to arrive at the target curve, the user 301 may select one of several types of target curve generation techniques at step 405. These techniques are described in more detail with reference to the remaining figures. Once a technique is chosen at step 405, the user 301 may input parameters that adjust the technique selected at step 405. Such parameters are also described in more detail below with reference to the remaining figures At step 407, the target curve is generated based at least upon the leader curve, the target curve generation technique, and the parameters inputted at step 406. The generated target curve is presented to the user 301 at step 408 and may be saved to the data storage system 303 for future use.

Figure 5:
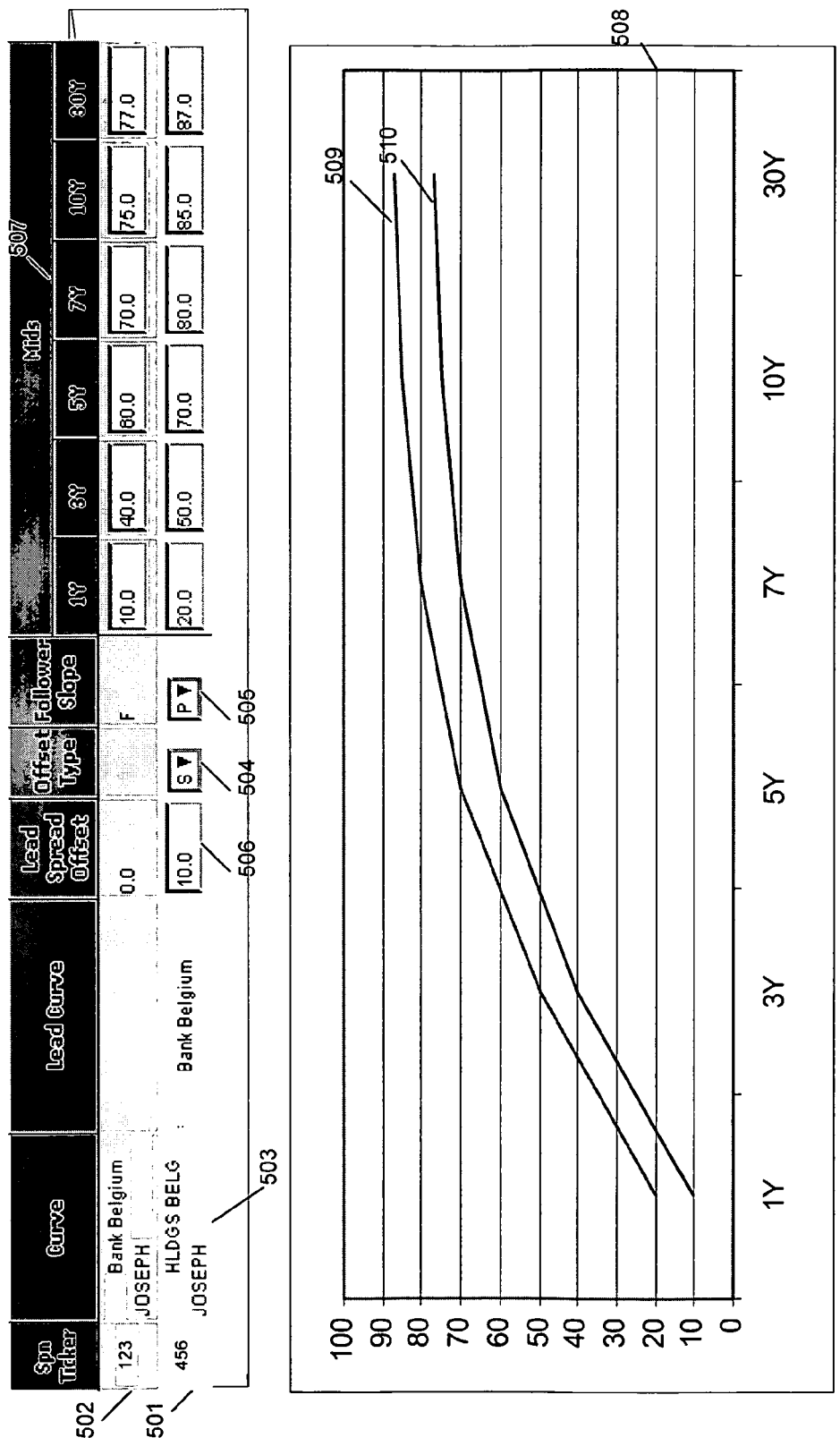
FIGS. 5-8 illustrate a "P" follower slope type, according to an embodiment of the present invention.

Several target curve generation techniques and associated parameters from steps 405 and 406 according to embodiments of the invention, will now be described. In FIG. 5, a row shown at 501 provides information regarding a target curve 509 (also referred to as a "follower curve"). A row shown at 502 provides information regarding the leader curve 510 selected at step 404. A name shown at 503 indicates the name of the target curve that was inputted and/or generated at step 403. "Offset Type" shown at 504 and "Follower Slope" shown at 505 are parameters used to identify a target curve generation technique selected at step 405. "Lead Spread Offset" shown at 506 is a parameter (e.g., an amount) used to determine how much to modify the leader curve 510 to arrive at the target curve 509. A graph 508 shows the leader curve 510 and the target curve 509 in relation to each other.

Offset types include "S" for Spread and "F" for Factorial. A spread offset type specifies that the lead spread offset amount 506 is to be added to the leader curve 510 at relevant points. A factorial offset type specifies that the leader curve 510 is multiplied by the lead spread offset amount 506 at relevant points to generate the target curve 509. In an embodiment of the present invention, the relevant points are the 1 year, 3 year, 5 year, 7 year, 10 year, and 30 year tenor points. However, one skilled in the art will appreciate that any point may be used.

The follower slope types include "P," "F," "L," "T," and "C." The follower slope type of "P" will be described with reference to FIGS. 5-8. The follower slope type of "F" will be described with reference to FIGS. 9-12. The follower slope type of "L" will be described with reference to FIGS. 13-16. The follower slope type of "T" will be described with reference to FIG. 17. The follower slope type of "C" will be described with reference to FIG. 18.

Figure 6:
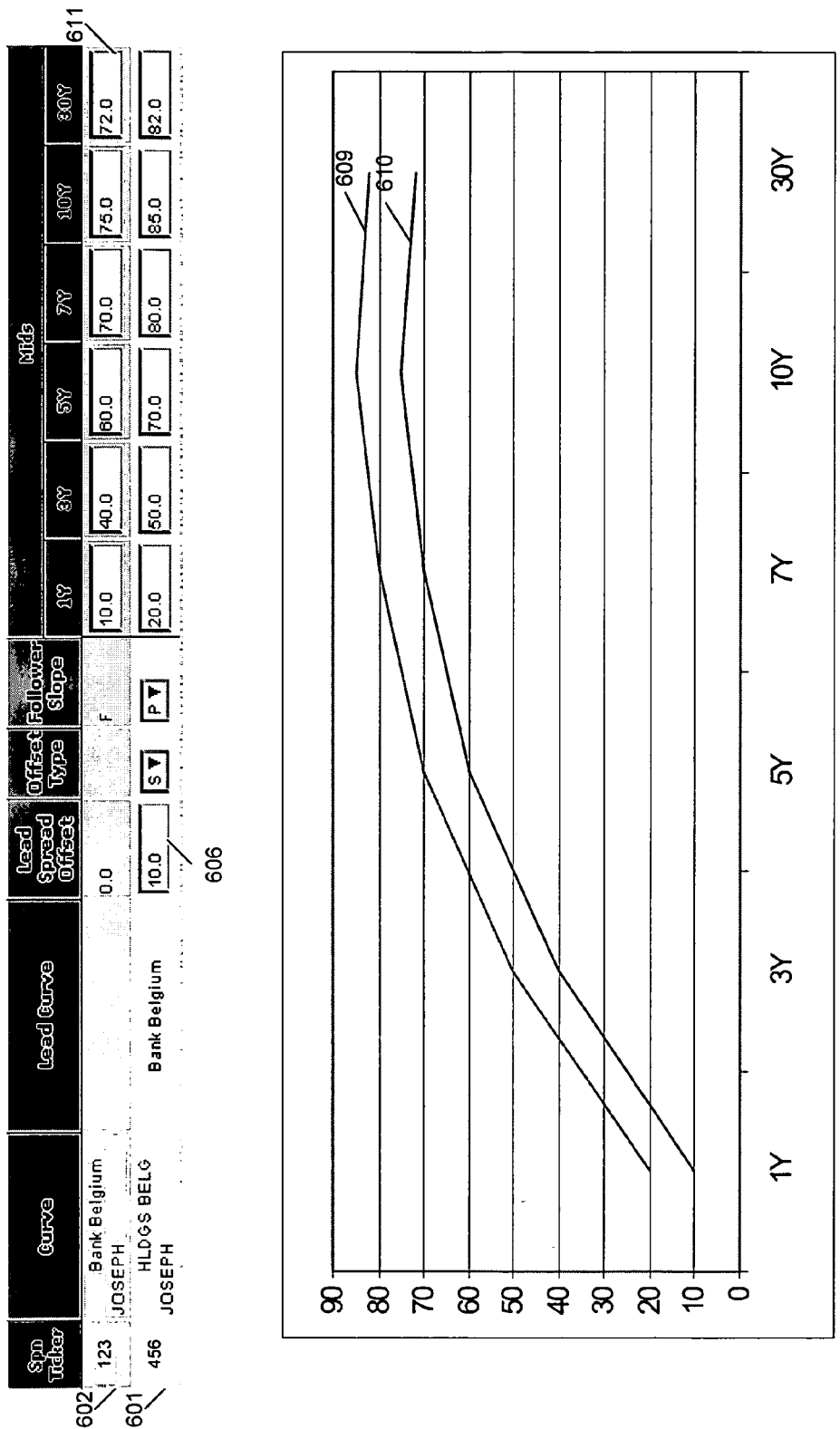

Returning to FIG. 5, the follower slope type of "P," as shown at 505, with a spread offset, as shown at 504, will be described. In this situation, each point in the leader curve 510 is offset by the lead spread offset amount 506. In the example of FIG. 5, each point in the leader curve 510 is increased by the lead spread offset amount 506 of 10.0. The points of the generated follower curve 501 are shown in the graph 508 as the curve 509. FIG. 6, which continues with the example of FIG. 5, illustrates that if a leader curve 610 is adjusted, for example, by decreasing the 30 year point 611 by five, i.e., 77−5=72, a follower curve 609 is adjusted in the same amount to maintain the lead spread offset amount 606 between the leader curve 610 and follower curve 609.

Figure 7:
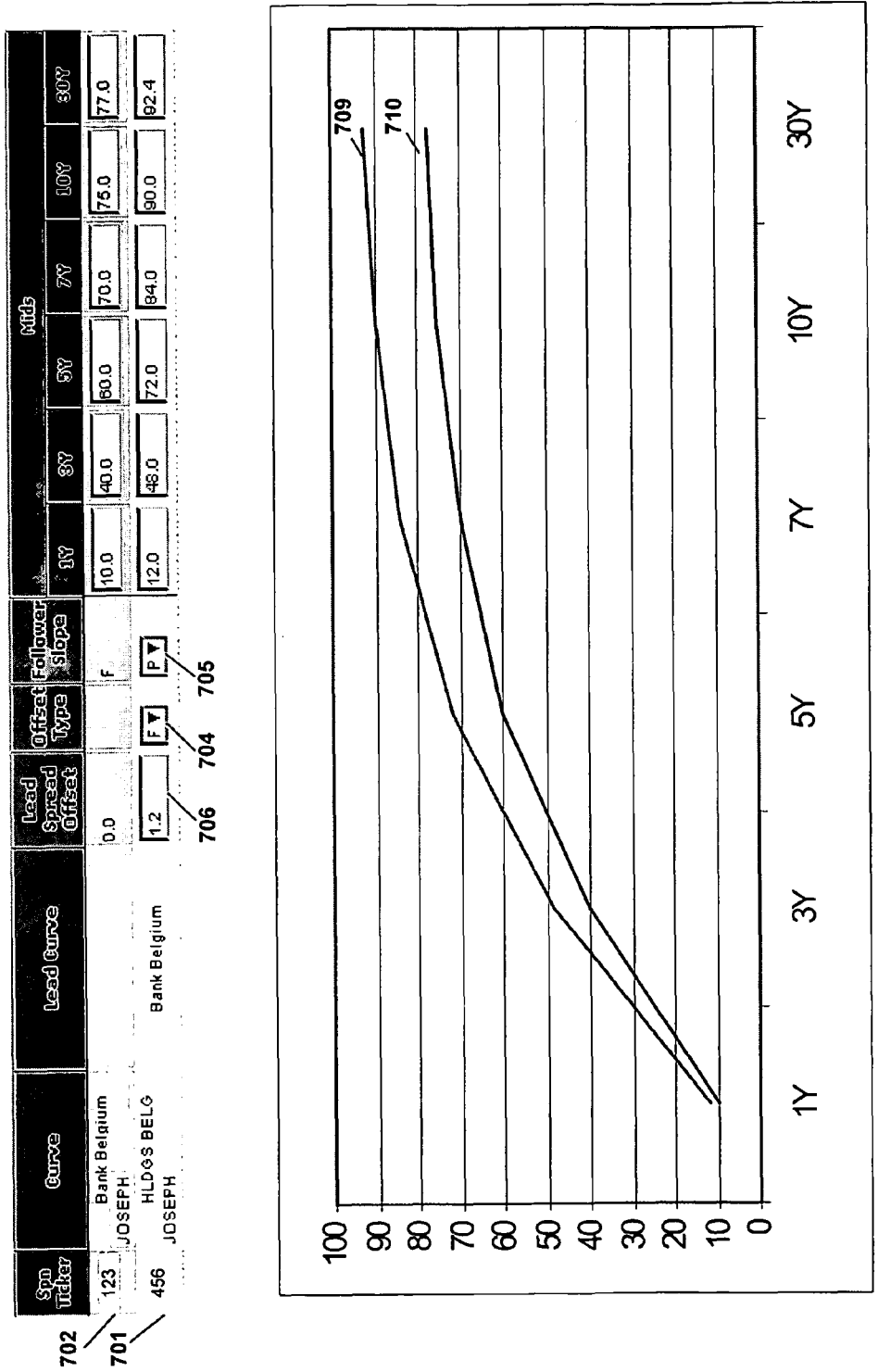
Figure 8:
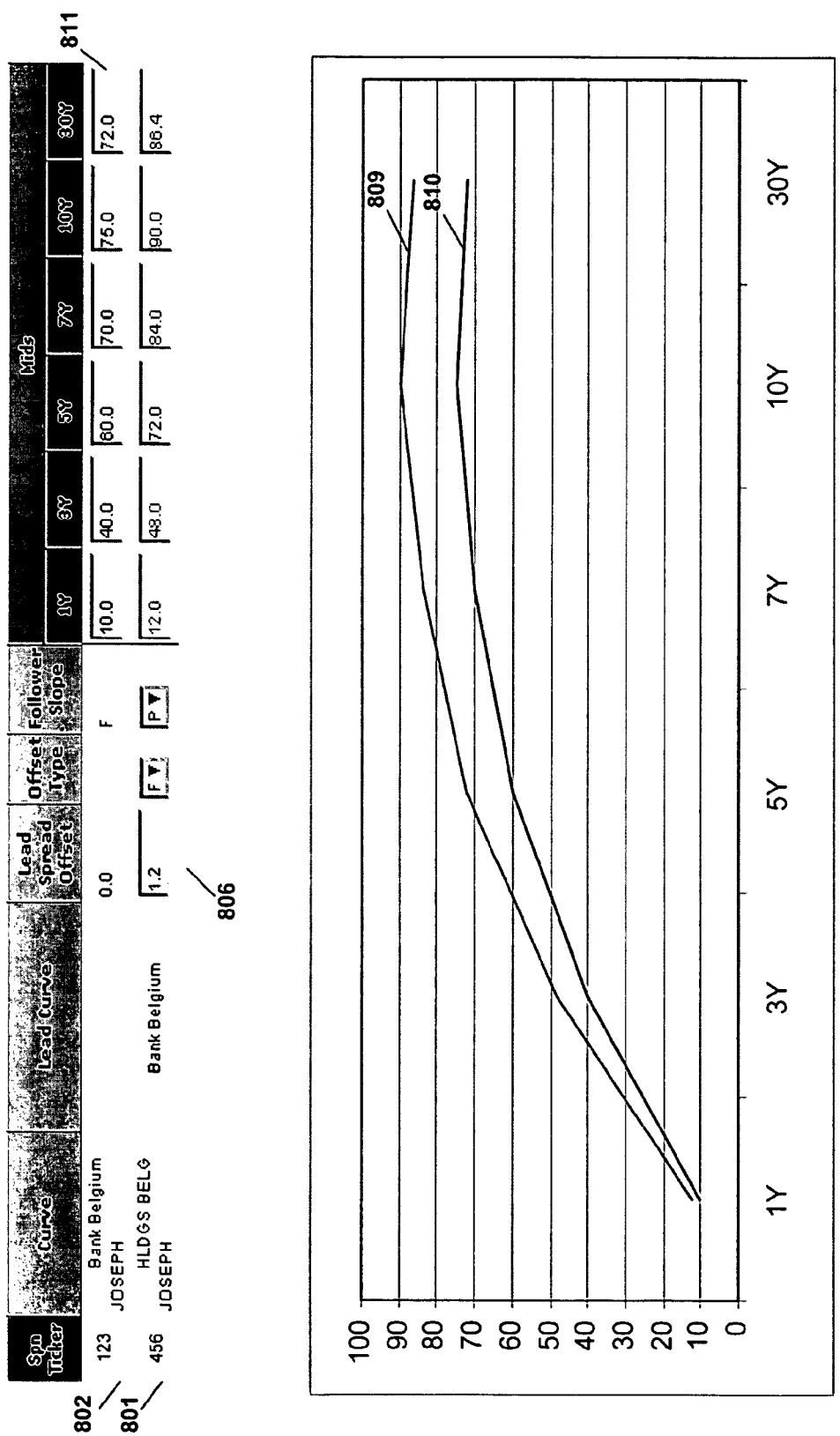

FIG. 7 illustrates an example of a follower slope type of "P," as shown at 705, with a factorial offset type, as shown at 704. With this target curve generation technique, each point of a leader curve 710 is multiplied by the lead spread offset amount 706 to arrive at a target curve 709. FIG. 8, which continues with the example of FIG. 7, illustrates that as a leader curve 810 changes, for example, by decreasing the 30-year point 811 by five, i.e., 77−5=72, the follower curve 809 is updated by multiplying the modified points in the leader curve 810 by the lead spread offset amount 806.

Figure 9:
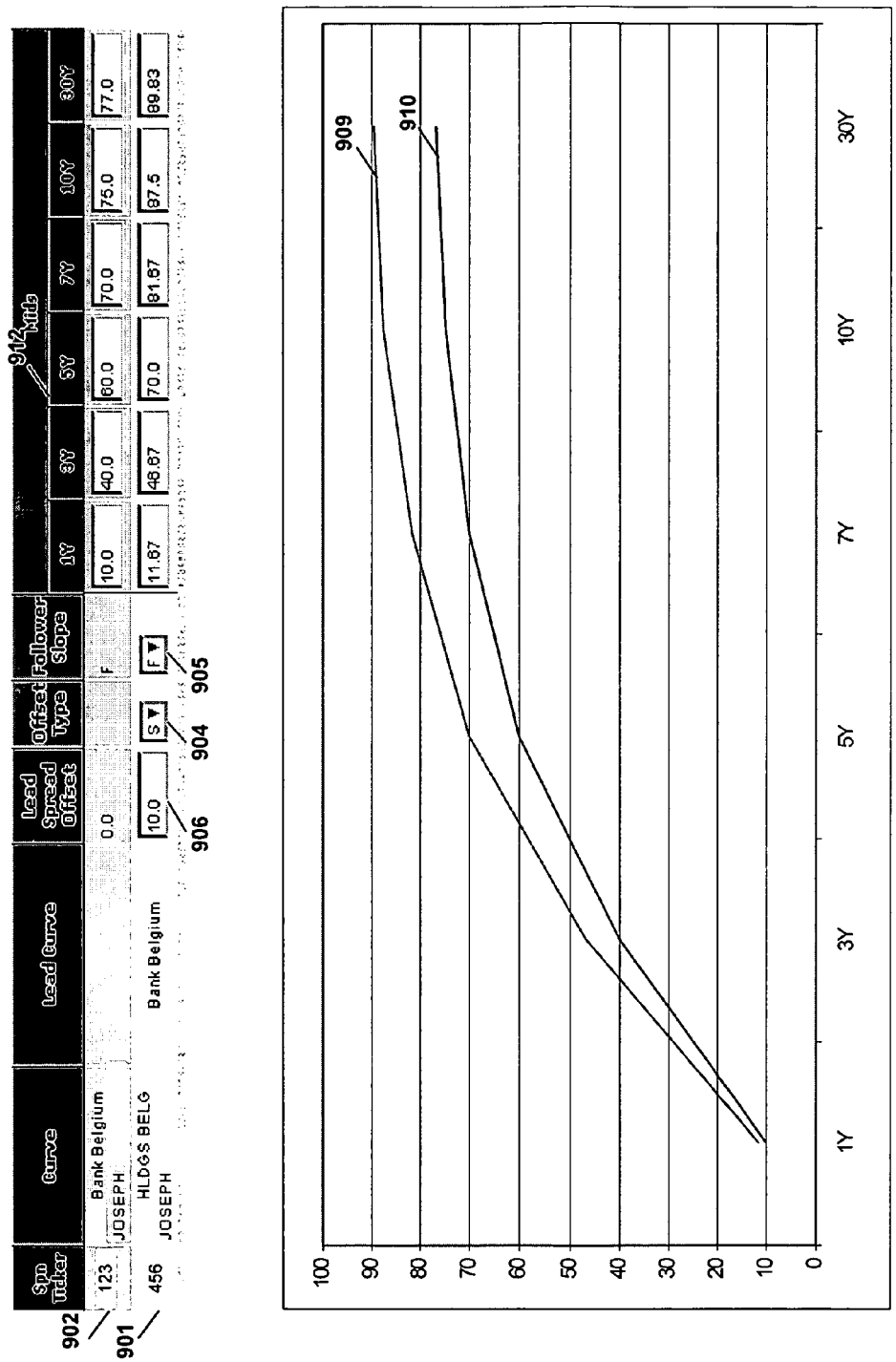
FIGS. 9-12 illustrate an "F" follower slope type, according to an embodiment of the present invention.
Figure 10:
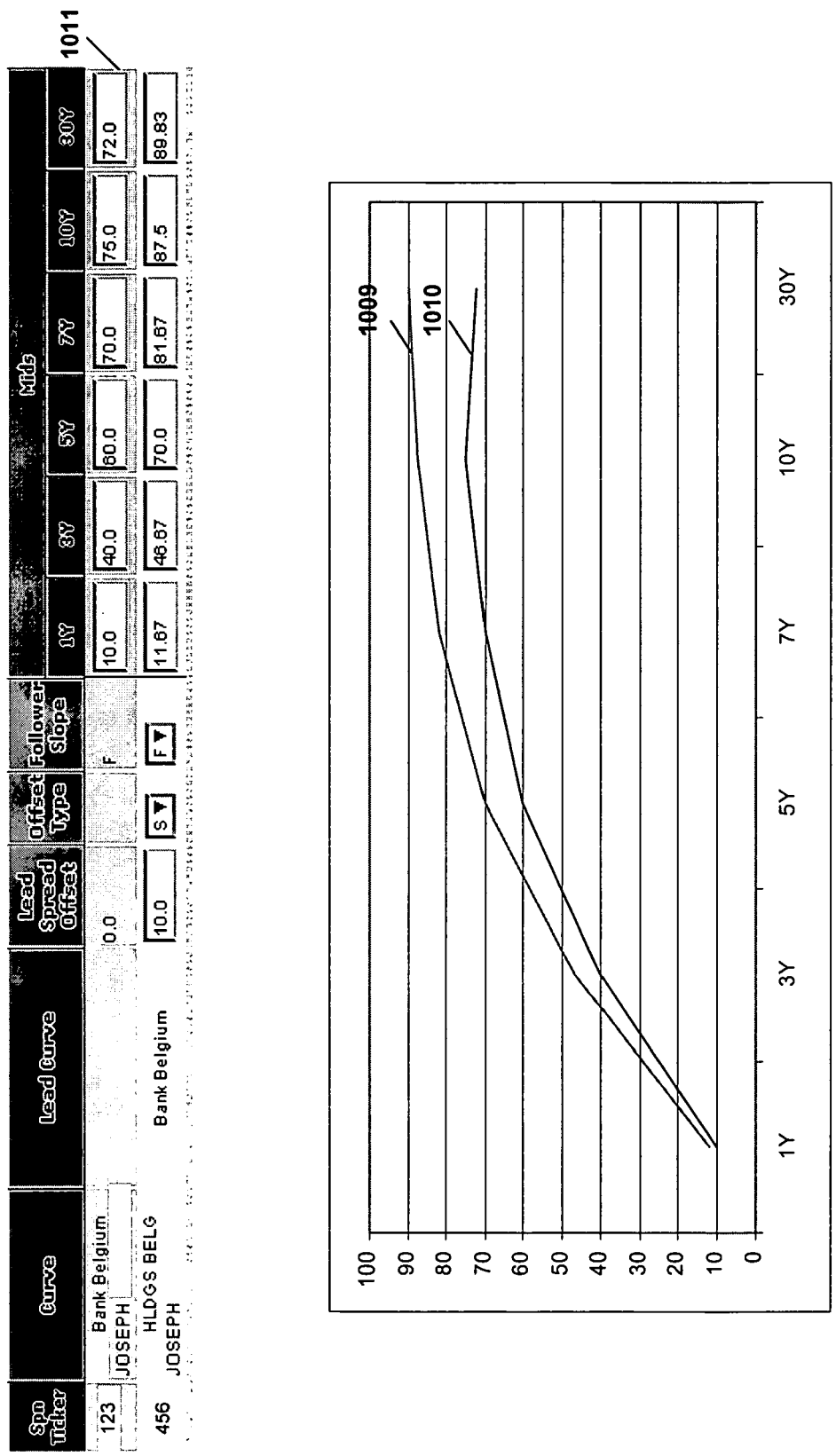

FIG. 9 illustrates an example of a follower slope type of "F," as shown at 905, with a spread offset type, as shown at 904. With this target curve generation technique, less than all points in a leader curve 910 are offset by the lead spread offset amount 906 to obtain a target curve 909. For all other points, no relationship between the leader curve 910 and the target curve 909 exists, and, consequently, the other points in the target curve 910 may acquire any value. In the example of FIG. 9, only the 5-year point 912 is selected to maintain the lead spread offset amount 906 of 10.0 between the leader curve 910 and the target curve 909. All other points in the target curve 909 may have any value, which may be manually specified by the user 301. The 5-year point 912 may be selected to have the forced offset relationship with the target curve 909 because it is often the most liquid point in the curve. In other words, the 5-year point is often the most traded tenor for a CDS, and consequently is advantageously imported into the target curve 909. If any of the selected points in the leader curve 910 change, the corresponding points in the target curve 909 are adjusted to maintain the lead spread offset amount 906. However, as shown in FIG. 10, if other points change, such as the 30-year point 1011, a corresponding point in a target curve 1009 does not change.

Figure 11:
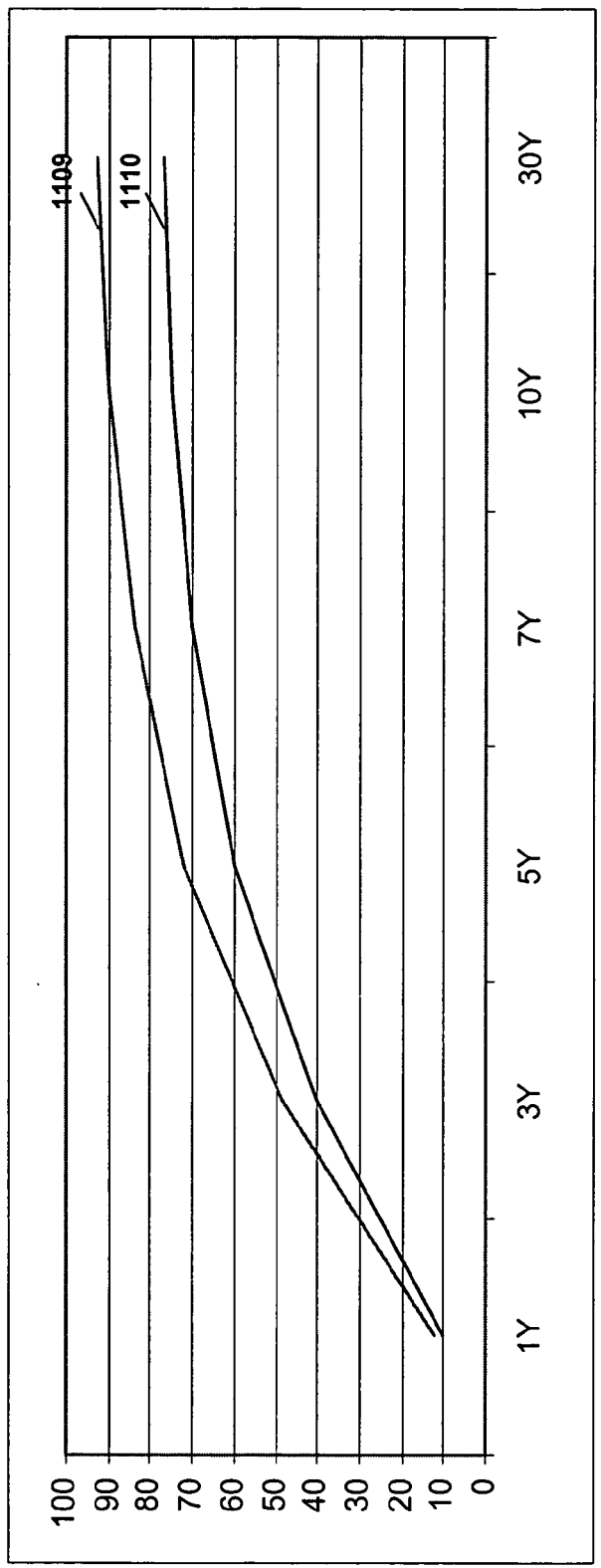
Figure 12:
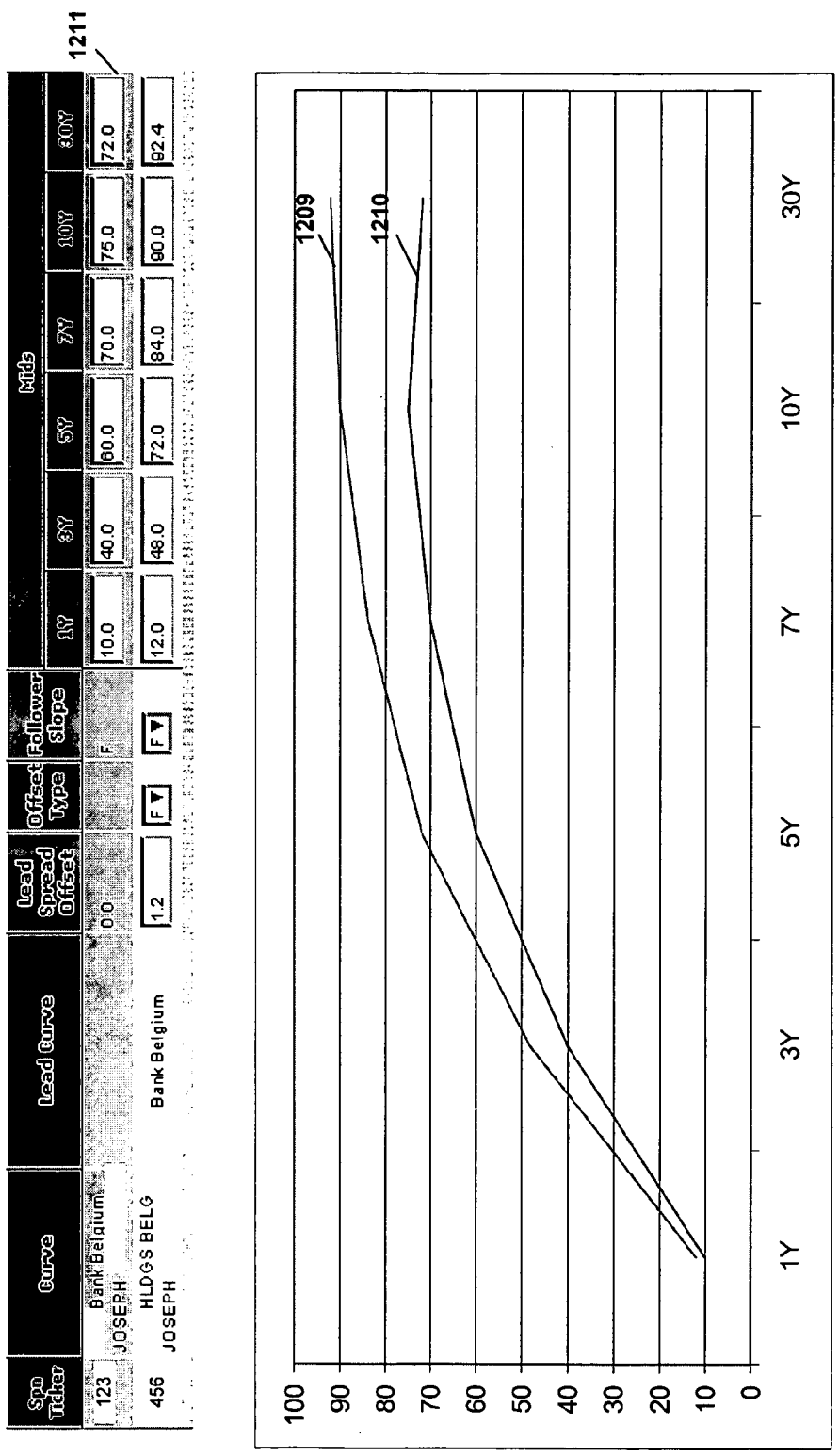

FIG. 11 illustrates an example of a follower slope type of "F," as shown at 1105, with a factorial offset type, as shown at 1104. With this target curve generation technique, less than all points in the leader curve 1110 are multiplied by the lead spread offset amount 1106 to obtain a target curve 1109. For all other points, no relationship between the leader curve 1110 and the target curve 1109 exists, and, consequently, the other points in the target curve 1109 may acquire any value. In the example of FIG. 11, only the 5-year point 1112 is selected to have a forced relationship between the leader curve 1110 and the target curve 1109. As shown in FIG. 12, all other non-selected points have no forced relationship, and if a leader curve 1210 changes at one of the non-relationship points, such as the 30-year point 1211 in this example, a corresponding target curve 1209 does not change.

Figure 13:
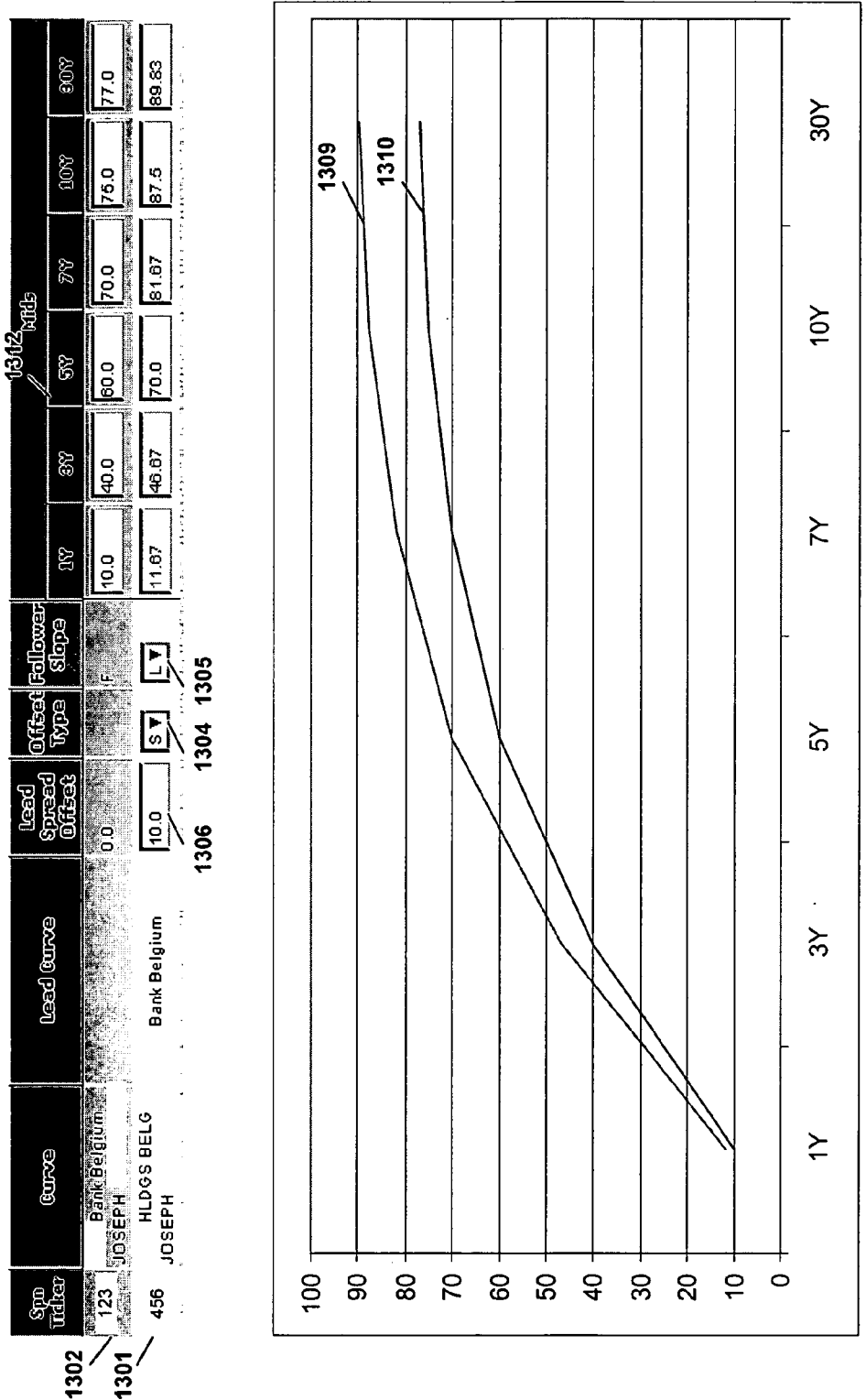
FIGS. 13-16 illustrate an "L" follower slope type, according to an embodiment of the present invention.
Figure 14:
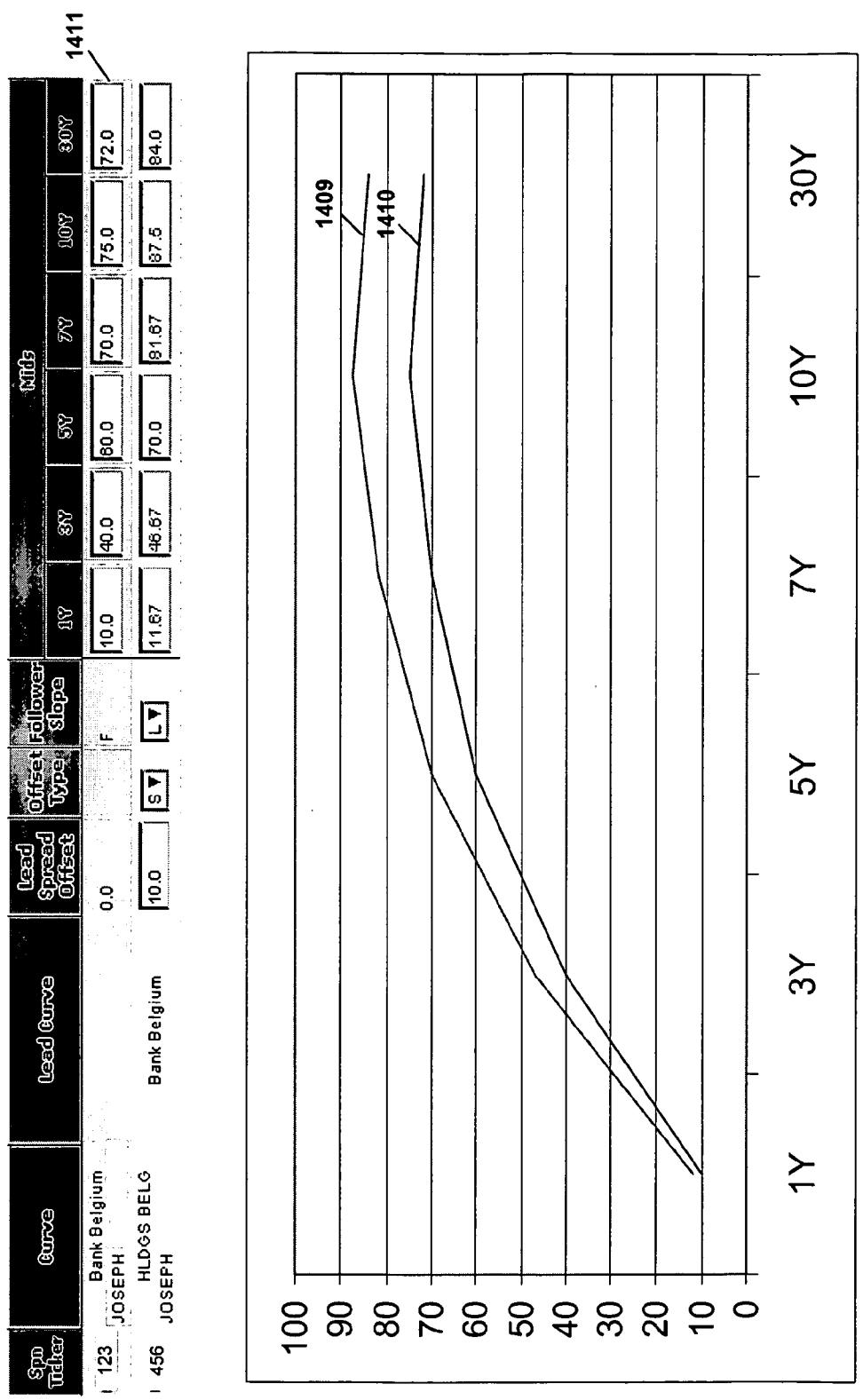

FIG. 13 illustrates an example of a follower slope type of "L," as shown at 1305, with a spread offset type, as shown at 1304. With this target curve generation technique, a selected point in a leader curve 1310 is offset by the lead spread offset amount 1306 to arrive at a target curve 1309. The ratio between the leader curve 1310 and the target curve 1309 at the selected point is enforced for all other points. In the example of FIG. 13, the selected point is the 5-year point 1312, so the 5-year point in the target curve 1309 equals the 5-year point of the leader curve 1310 plus the lead spread offset amount 1306. The ratio between the leader curve 1310 and the target curve 1309 at the 5-year point, in this example, is 6/7. This ratio is maintained at all other points. As shown at the 30-year point 1411 in FIG. 14, which continues with the example of FIG. 13, the ratio is maintained even if the leader curve 1410 is changed.

Figure 15:
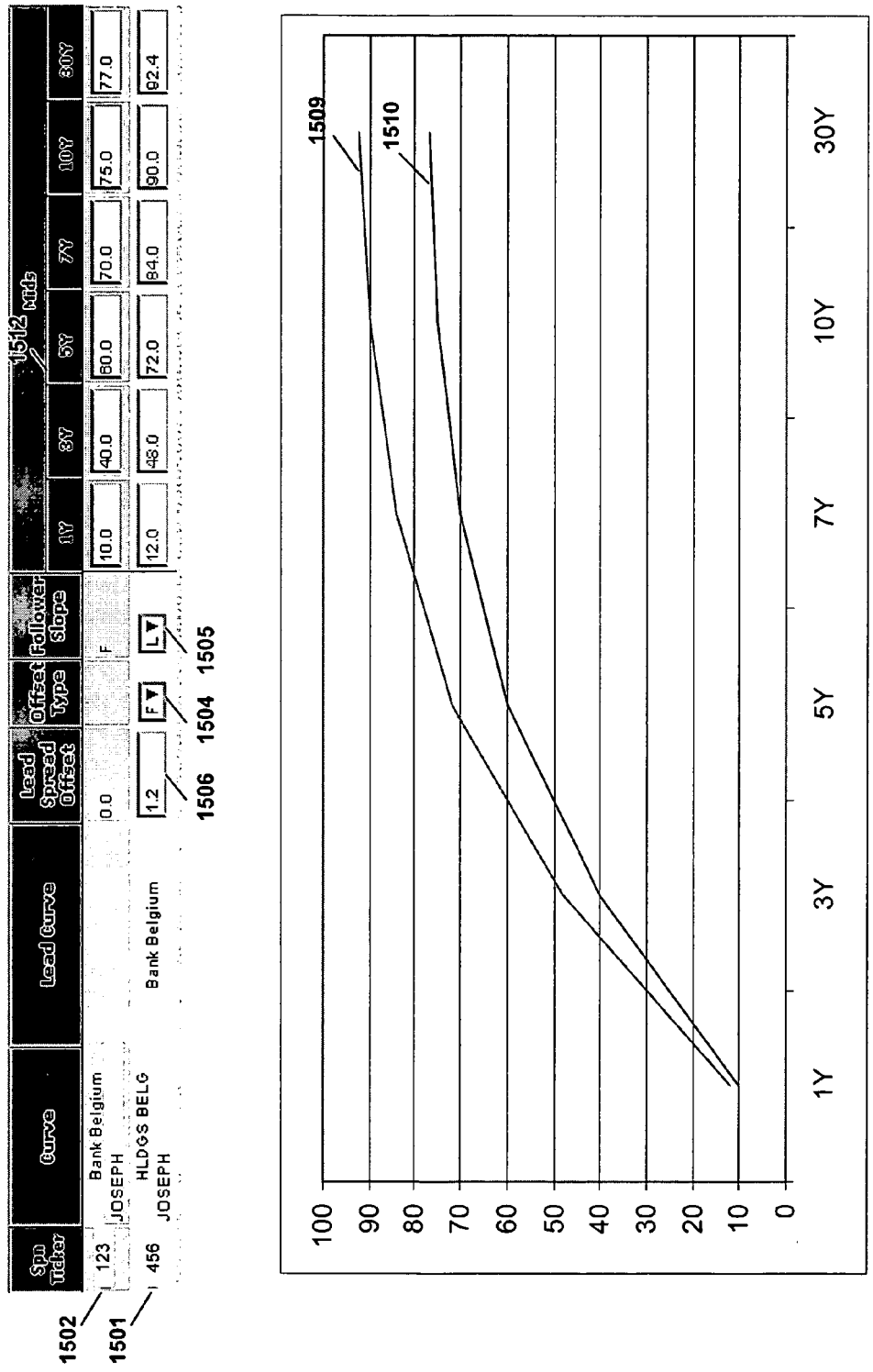
Figure 16:
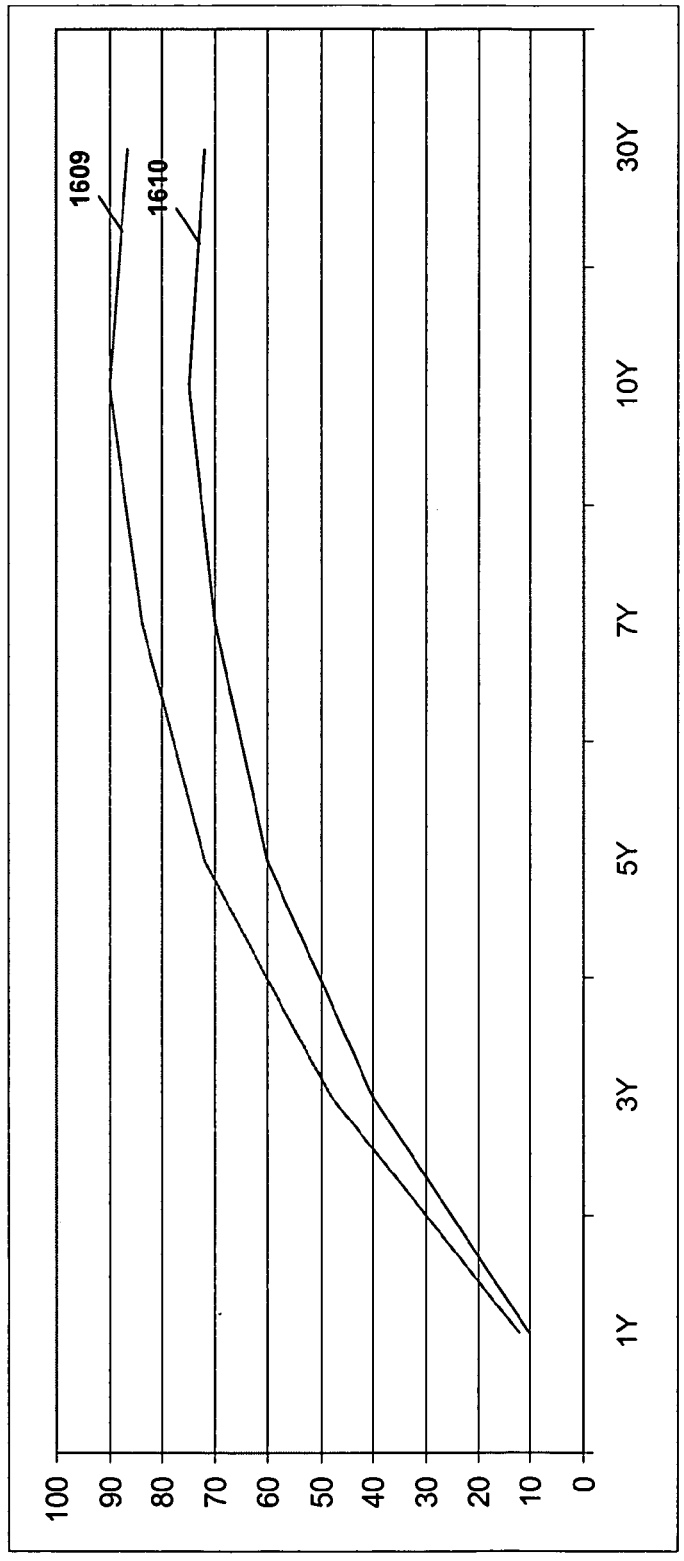

FIG. 15 illustrates an example of a follower slope type of "L," as shown at 1505, with a factorial offset type, as shown at 1504. With this target curve generation technique, a selected point in a leader curve 1510 is multiplied by the lead spread offset amount 1506 to arrive at a target curve 1509. The ratio between the leader curve 1510 and the target curve 1509 at the selected point is enforced for all other points. In the example of FIG. 15, the selected point is the 5-year point 1512, so the 5-year point in the target curve 1509 equals the 5-year point of the leader curve 1510 multiplied by the lead spread offset amount 1506. The ratio between the leader curve 1510 and the target curve 1509 at the 5-year point is 60/72. This ratio is maintained at all other points. As shown at the 30-year point 1611 in FIG. 16, even if a leader curve 1610 is changed, a ratio between the leader curve 1610 and a corresponding target curve 1609 is maintained.

Figure 17:
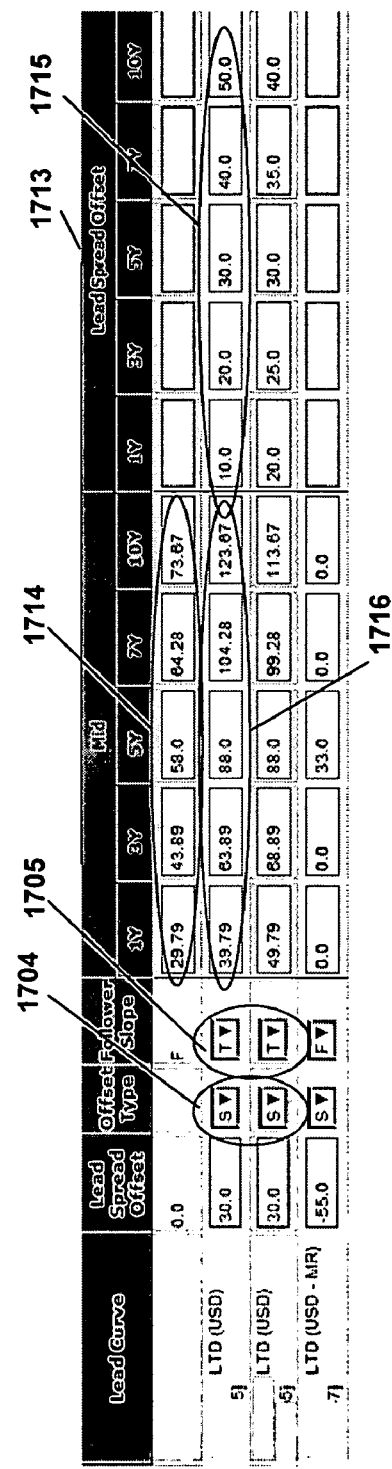
FIG. 17 illustrates a "T" follower slope type, according to an embodiment of the present invention.

FIG. 17 illustrates an example of a follower slope type of "T," as shown at 1705. For this follower slope type, a lead spread offset may be specified for each of a plurality of points, as shown at 1713. If the offset type 1704 is spread, then each point of the leader curve is offset by the lead spread offset amount for the corresponding point to arrive at a target curve. For example, the 1-year, 3-year, 5-year, 7-year, and 10-year points of a leader curve are specified at 1714. Lead spread offsets for each of these points are specified at 1715. Points of a target curve generated by these lead spread offsets 1715 are shown at 1716. The 1-year point at 1716 is generated by adding the 1-year lead spread offset amount at 1715 to the 1-year point in the leader curve at 1714. That is, 29.79+10.0=39.79. The same procedure is repeated for each of the other points in the leader curve described at 1714. A similar procedure is followed when an offset type 1704 is factorial (not shown). In this case, each point of the leader curve is multiplied by the lead spread offset amount for the corresponding point to arrive at a target curve.

If the leader curve 1714 is changed, the relationship between each modified point of the leader curve and the target curve, as specified by the associated lead spread offset 1713 and the offset type 1704, is enforced. Optionally, the market value of the target curve is generated so as not to fall below a predetermined value, or floor. For example, if an offset is specified that would generate a negative market value in the target curve, a market value of $0 may be specified for such a point.

The follower slope type of "T" allows the user 301 great flexibility as to how the leader curve should be modified to generate the target curve. For instance, this follower slope type allows a trader to mark offsets differently at different maturities. Because different transactions involve different contract terms, some of which apply more to the long end or short end of the curve, this follower slope type allows for added flexibility in controlling how the impact of these maturity sensitive terms are incorporated into the follower curve. Further, this follower slope type allows the user 301 to flexibly incorporate specific knowledge about differences between the company associated with the leader curve and the company associated with the target curve into the target curve generation process.

Figure 18:
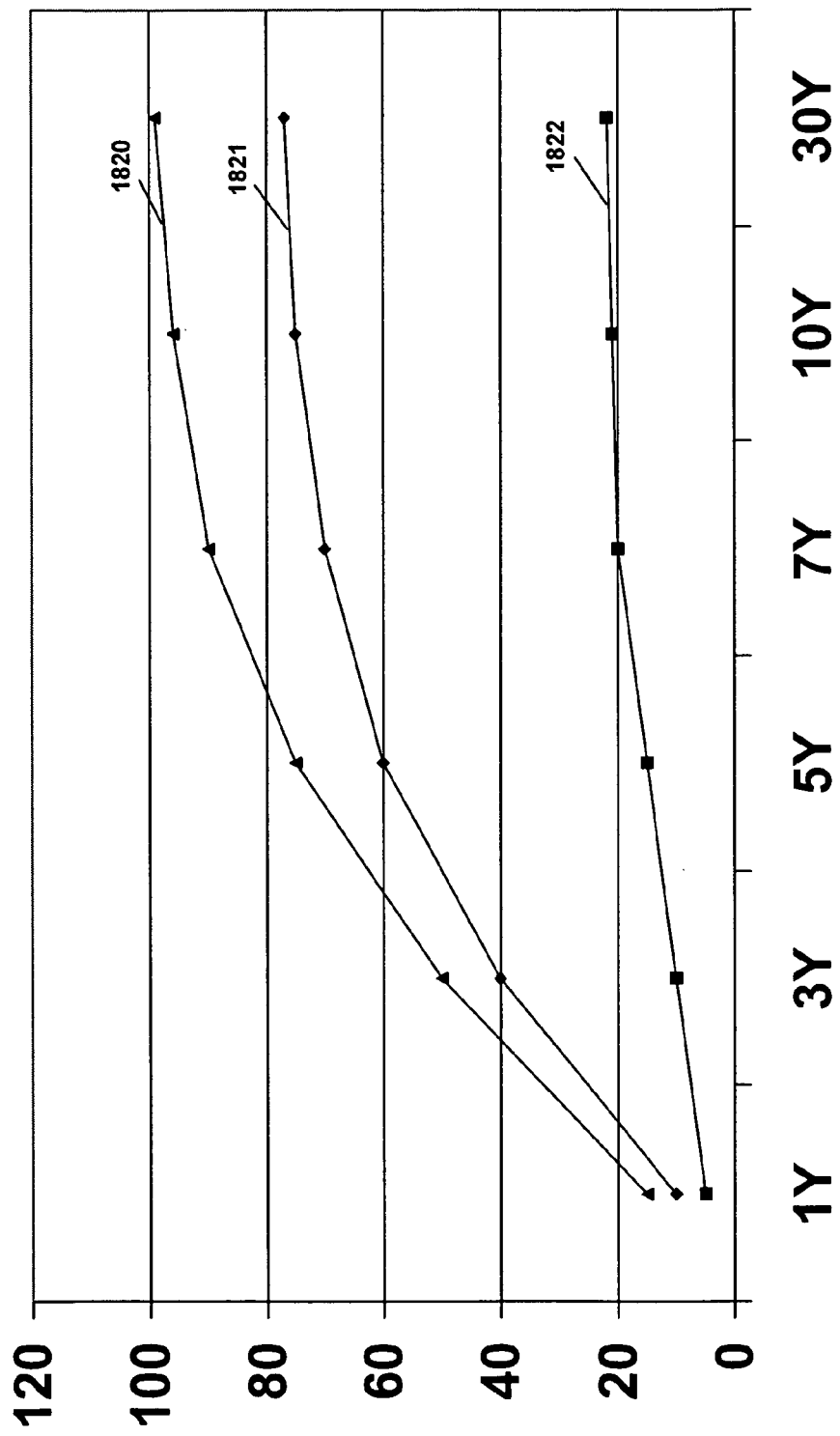
FIG. 18 illustrates a "C" follower slope type, according to an embodiment of the present invention.

FIG. 18 illustrates an example of a follower slope type of "C". For this follower slope type, the user 301 selects or defines an offsetting curve 1822 that is subtracted from a leader curve 1820 to arrive at a target curve 1821. One skilled in the art will appreciate, however, that the offsetting curve may be added to the leader curve 1820, or combined with the leader curve 1820 in another fashion to arrive at the target curve 1821. An example of the offsetting curve 1822 is the U.S. Government curve known in the art. If the leader curve 1820 and/or the offsetting curve 1822 change, the target curve 1821 may be automatically updated to reflect the change. Optionally, the market value of the target curve is generated so as not to fall below a predetermined value, or floor.

In contrast to the follower slope type of "T" shown, for example, in FIG. 17, the "C" follower slope type allows the use of an offsetting curve 1822 that may include many more specified points than those manually specified by the "T" follower slope type. Further, an actual pre-existing curve may be used as the offsetting curve 1822, instead of manually specifying points, as shown in the "T" follower slope type. Additionally, if the offsetting curve 1822 is a pre-existing curve that is changed, the target curve 1821 may be updated automatically to reflect such change.

It is to be understood that the exemplary embodiments are merely illustrative of the present invention and that many variations of the above-described embodiments can be devised by one skilled in the art without departing from the scope of the invention. For instance, although embodiments of the invention are described in the context of CDS curves, one skilled in the art will appreciate that the curve generation methodology described herein may be applied to other types of curves including, without limitation, curves pertaining to portfolio credit derivatives, collateralized asset swaps, credit swap options, credit default swaps, credit downgrades, credit linked notes, asset backed securities, wrapped asset backed securities, collateralized notes, collateralized loans, super seniors, equity default swaps, equity stability swaps, equity bill swaps, and bonds. It is therefore intended that any and all such variations be included within the scope of the following claims and their equivalents.

What is claimed is:

1. A method for generating a target financial risk management curve, using a computer, the method comprising the steps of:
    selecting a pre-existing financial risk management curve as a leader curve of a first company using the computer, the leader curve including a plurality of points;
    selecting at least one technique using at least a parameter required for generating the target financial risk management curve using the computer;
    specifying an offset based on said selected technique for each of the plurality of points in the leader curve independently of other points of the plurality of points in the leader curve using the computer, said offset quantifying differences between the leader curve and the target financial risk management curve, wherein said target financial risk management curve includes a plurality of points offset from the leader curve by the offsets specified for the plurality of points in the leader curve; and
    modifying said leader curve to generate the target financial risk management curve for a second company using the computer;
    wherein said second company has insufficient market information available to generate a target financial risk management curve based on said second company's market information, and said second company has similar characteristics to said first company.

2. The method of claim 1, further comprising the step of updating the target financial risk management curve to reflect a change in the leader curve.

3. The method of claim 1, further comprising the step of storing the target financial risk management curve in a data storage system.

4. The method of claim 3, wherein the leader curve is selected from the data storage system.

5. The method of claim 1, wherein the offsets quantify known differences between the leader company and the target company.

6. The method of claim 1, wherein the leader curve is associated with a first financial instrument and the target financial risk management curve is associated with a second financial instrument that is different from the first financial instrument.

7. The method of claim 1, wherein the target financial risk management curve is a Credit Default Swap ("CDS") curve, a dimension of the target financial risk management curve specifies a market value of a CDS, and a dimension of the target financial risk management curve specifies a tenor.

8. The method of claim 1, wherein the target financial risk management curve is a portfolio credit derivatives curve, a collateralized asset swap curve, a credit swap option curve, a credit default swap curve, a credit downgrade curve, a credit linked notes curve, an asset backed securities curve, a wrapped asset backed securities curve, a collateralized notes curve, a collateralized loans curve, a super senior curve, an equity default swap curve, an equity stability swap curve, an equity bill swap curve, or a bond curve.

9. The method of claim 1, wherein a dimension of the target financial risk management curve specifies a market value, and the market value does not fall below a predetermined value.

10. A method for generating a target financial risk management curve using a computer, the method comprising the steps of:

selecting a pre-existing financial risk management curve as a leader curve for a first company using the computer;

selecting based on at least one parameter an offsetting financial risk management curve using the computer, wherein said offsetting financial risk management curve specifies an offset quantifying differences between the leader curve and the target financial risk management curve; and generating a target financial risk management curve for a second company by modifying the leader curve based upon the offsetting financial risk management curve using the computer, wherein said second company has insufficient market information available to generate a target financial risk management curve based on said second company's market information, and said second company has similar characteristics to said first company.

11. The method of claim 10, wherein the step of generating the target financial risk management curve adds or subtracts the offsetting financial risk management curve to/from the leader curve.

12. The method of claim 10, further comprising the step of updating the target financial risk management curve to reflect a change in the leader curve.

13. The method of claim 10, further comprising the step of updating the target financial risk management curve to reflect a change in the offsetting curve.

14. The method of claim 10, further comprising the step of storing the target financial risk management curve in a data storage system.

15. The method of claim 14, wherein at least one of the leader curve and the offsetting curve is selected from the data storage system.

16. The method of claim 10, wherein the target financial risk management curve is a Credit Default Swap ("CDS") curve, a dimension of the target financial risk management curve specifies a market value of a CDS, and a dimension of the target financial risk management curve specifies a tenor.

17. The method of claim 10, wherein the target financial risk management curve is a portfolio credit derivatives curve, a collateralized asset swap curve, a credit swap option curve, a credit default swap curve, a credit downgrade curve, a credit linked notes curve, an asset backed securities curve, a wrapped asset backed securities curve, a collateralized notes curve, a collateralized loans curve, a super senior curve, an equity default swap curve, an equity stability swap curve, an equity bill swap curve, or a bond curve.

18. The method of claim 10, wherein a dimension of the target financial risk management curve specifies a market value, and the market value does not fall below a predetermined value.

* * * * *